US012566416B2

(12) United States Patent
Morles et al.

(10) Patent No.: US 12,566,416 B2
(45) Date of Patent: Mar. 3, 2026

(54) MODELLING OF A FLUID TREATMENT SYSTEM

(71) Applicant: CHEVRON U.S.A. INC., San Ramon, CA (US)

(72) Inventors: Martin Antonio Morles, Katy, TX (US); Lauren A. Flores, Katy, TX (US); Cheng Chen, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 1049 days.

(21) Appl. No.: 17/586,846

(22) Filed: Jan. 28, 2022

(65) Prior Publication Data

US 2022/0236699 A1 Jul. 28, 2022

Related U.S. Application Data

(60) Provisional application No. 63/219,185, filed on Jul. 7, 2021, provisional application No. 63/142,624, filed on Jan. 28, 2021.

(51) Int. Cl.
*G05B 13/04* (2006.01)
*C02F 1/00* (2023.01)

(52) U.S. Cl.
CPC ............ *G05B 13/048* (2013.01); *C02F 1/008* (2013.01); *C02F 2209/006* (2013.01)

(58) Field of Classification Search
None
See application file for complete search history.

(56) References Cited

U.S. PATENT DOCUMENTS

| | | | |
|---|---|---|---|
| 10,906,001 B2 | 2/2021 | Chen | |
| 2015/0376033 A1 | 12/2015 | Tao | |
| 2019/0299162 A1 | 10/2019 | Chen | |
| 2020/0071209 A1 | 3/2020 | Han | |
| 2020/0254391 A1 | 8/2020 | Lee | |
| 2020/0320448 A1* | 10/2020 | Machida | G06Q 10/06 |
| 2020/0353421 A1 | 11/2020 | Anditya | |

(Continued)

OTHER PUBLICATIONS

Bagheri, Majid, Ali Akbari, and Sayed Ahmad Mirbagheri. "Advanced control of membrane fouling in filtration systems using artificial intelligence and machine learning techniques: A critical review." Process Safety and Environmental Protection 123 (2019): 229-252. (Year: 2019).*

(Continued)

*Primary Examiner* — Rehana Perveen
*Assistant Examiner* — Kyle H Tseng
(74) *Attorney, Agent, or Firm* — Ana C. Jaquez

(57) ABSTRACT

Embodiments of modelling a fluid treatment system are provided herein. One embodiment comprises obtaining synthetic data for a fluid treatment system from a data store. The fluid treatment system comprises a membrane and the fluid treatment system is configured to receive a stream of fluid for treatment. The embodiment comprises training a machine learning pressure prediction model using the synthetic data to predict a pressure for the membrane of the fluid treatment system. The trained pressure prediction model is combinable with an operator training simulator (OTS) model to update the OTS model to improve accuracy of simulation pressure output from the OTS model.

20 Claims, 32 Drawing Sheets

600 obtaining synthetic data for a fluid treatment system from a data store, wherein the fluid treatment system comprises a membrane and the fluid treatment system is configured to receive a stream of fluid for treatment 605 training a performance indicator model using the synthetic data to predict a performance indicator for the fluid treatment system, wherein the performance indicator comprises a permeate sulfate performance indicator and the performance indicator model predicts a sulfate content value in a permeate stream 610 obtaining process data for the fluid treatment system after operation commences at the fluid treatment system from a data store; combining the process data with the synthetic data to generate hybrid data; and retraining the trained performance indicator model using the hybrid data to form a retrained performance indicator model 615 generating a maintenance recommendation for the membrane based on a predicted sulfate content value in the permeate stream, a predicted fouling factor value for the membrane, a predicted TDS content value in the permeate stream, or any combination thereof 620 obtaining second synthetic data from a data store; and generating, with the performance indicator model, a predicted sulfate content value in the permeate stream based on the second synthetic data 625

Permeate TDS model 630

Fouling Factor model 635

Anomaly detection model 640

(56) References Cited

U.S. PATENT DOCUMENTS

| | | |
|---|---|---|
| 2021/0069652 A1* | 3/2021 | Kobayashi ............. B01D 65/02 |
| 2022/0161193 A1 | 5/2022 | Pan |
| 2022/0236700 A1 | 7/2022 | Chen |

OTHER PUBLICATIONS

Inoue, Jun, Yoriyuki Yamagata, Yuqi Chen, Christopher M. Poskitt, and Jun Sun. "Anomaly detection for a water treatment system using unsupervised machine learning." In 2017 IEEE international conference on data mining workshops (ICDMW), pp. 1058-1065. IEEE, 2017. (Year: 2017).*

Xu, Tingting, Giovanni Coco, and Martin Neale. "A predictive model of recreational water quality based on adaptive synthetic sampling algorithms and machine learning." Water research 177 (2020): 115788. (Year: 2020).*

Roehl Jr, Edwin A., David A. Ladner, Ruby C. Daamen, John B. Cook, Jana Safarik, Donald W. Phipps Jr, and Peng Xie. "Modeling fouling in a large RO system with artificial neural networks." Journal of membrane science 552 (2018): 95-106. (Year: 2018).*

Chen, Cheng, et al.; "Produced Water Desalination Using High Temperature Membranes"; (Oct. 2021), vol. 513, 115144, pp. 1-8.

Pedregosa, Fabian, et al.; "Scikit-learn: Machine Learning in Python"; (2011), Journal of Machine Learning Research, vol. 12, pp. 2825-2830.

IBM, "IBM Cloud Learn Hub"; IBM, (Aug. 19, 2020), downloaded on Sep. 7, 2022, Online: https://www.ibm.com/cloud/learn/supervised-learning, 6 pages.

Google, "Google Courses"; Google, (Feb. 10, 2020), downloaded on Sep. 7, 2022, Online: https://developers.google.com/machine-learning/crash-course/exercises, 13 pages.

Wikipedia, "Wikipedia"; Wikipedia, (Sep. 2020), downloaded on Sep. 7, 2022, Online: https://en.wikipedia.org/wiki/Data_augmentation, 4 pages.

Carpenter. "Machine-Learning Techniques Track, Monitor Offshore Water-Treatment KPIs." J Pet Technol 73 (2021): 54-55. doi: https://doi.org/10.2118/1221-0054-JPT.

Roehl Jr, et al. "Modeling fouling in a large RO system with artificial neural networks." Journal of membrane science 552 (2018): 95-106.

Flores et al. "Offshore water treatment KPIs using machine learning techniques." SPE Annual Technical Conference and Exhibition. Sep. 2021. Paper No. SPE-206173-MS. 8 pages.

Ragi et al. "Predicting water quality parameters using machine learning." 2019 4th International Conference on Recent Trends on Electronics, Information, Communication & Technology (RTEICT). IEEE, 2019. pp. 1109-1112.

Xu et al. "A predictive model of recreational water quality based on adaptive synthetic sampling algorithms and machine learning." Water research 177 (2020): 115788.

United States Office Action mailed on Jun. 9, 2025 issued in U.S. Appl. No. 17/586,858, filed Jan. 28, 2022, 47 pages.

Wikipedia Description of Ensemble Methods From Jan. 16, 2021, https://web.archive.org/web/20210116224519/https://scikit-learn.org/stable/ensemble.html (Year: 2021).

* cited by examiner

600 obtaining synthetic data for a fluid treatment system from a data store, wherein the fluid treatment system comprises a membrane and the fluid treatment system is configured to receive a stream of fluid for treatment 605 training a performance indicator model using the synthetic data to predict a performance indicator for the fluid treatment system, wherein the performance indicator comprises a permeate sulfate performance indicator and the performance indicator model predicts a sulfate content value in a permeate stream 610 obtaining process data for the fluid treatment system after operation commences at the fluid treatment system from a data store; combining the process data with the synthetic data to generate hybrid data; and retraining the trained performance indicator model using the hybrid data to form a retrained performance indicator model 615 generating a maintenance recommendation for the membrane based on a predicted sulfate content value in the permeate stream, a predicted fouling factor value for the membrane, a predicted TDS content value in the permeate stream, or any combination thereof 620 obtaining second synthetic data from a data store; and generating, with the performance indicator model, a predicted sulfate content value in the permeate stream based on the second synthetic data 625

Figure 6:
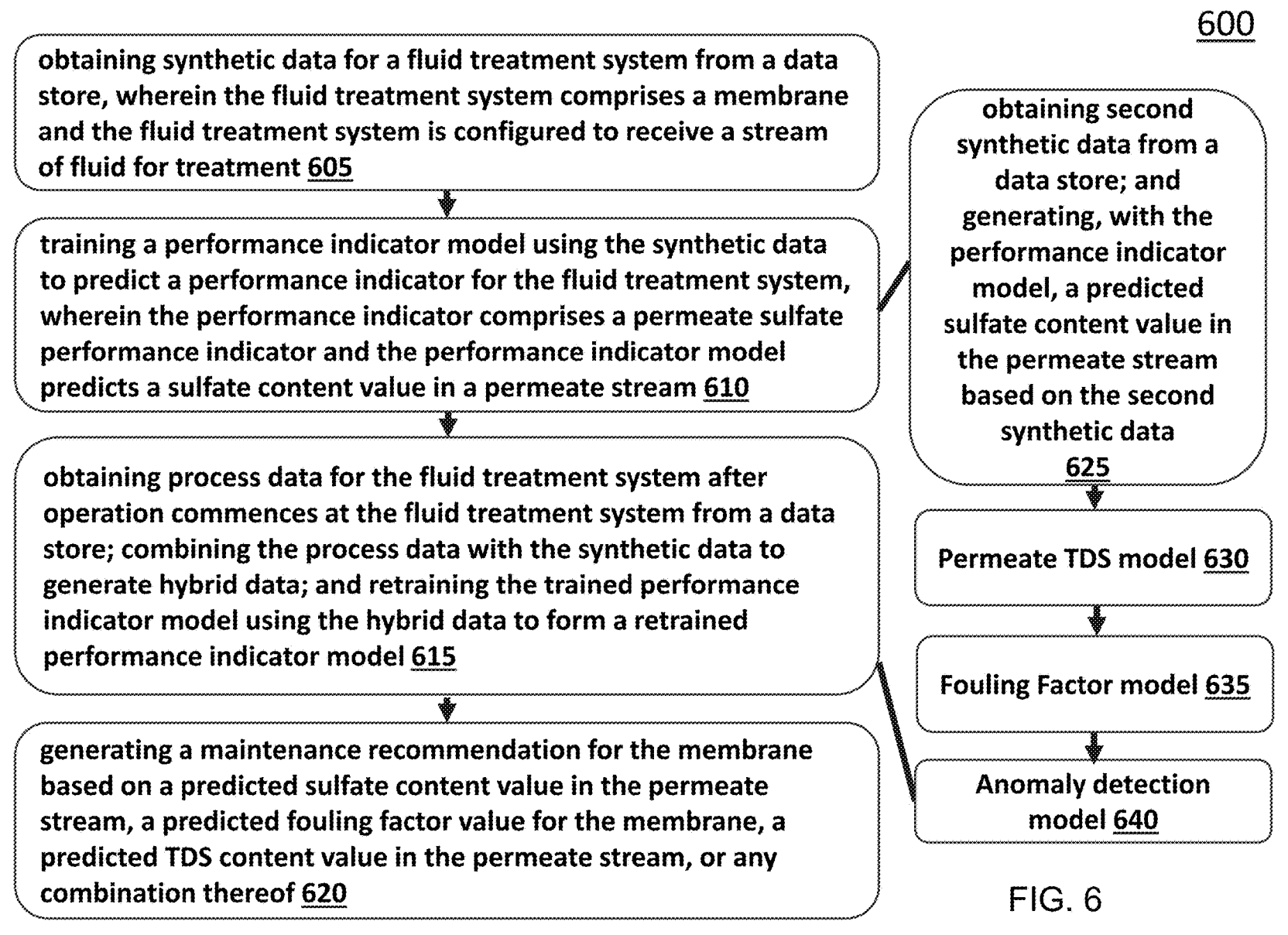

Permeate TDS model 630

Fouling Factor model 635

Anomaly detection model 640

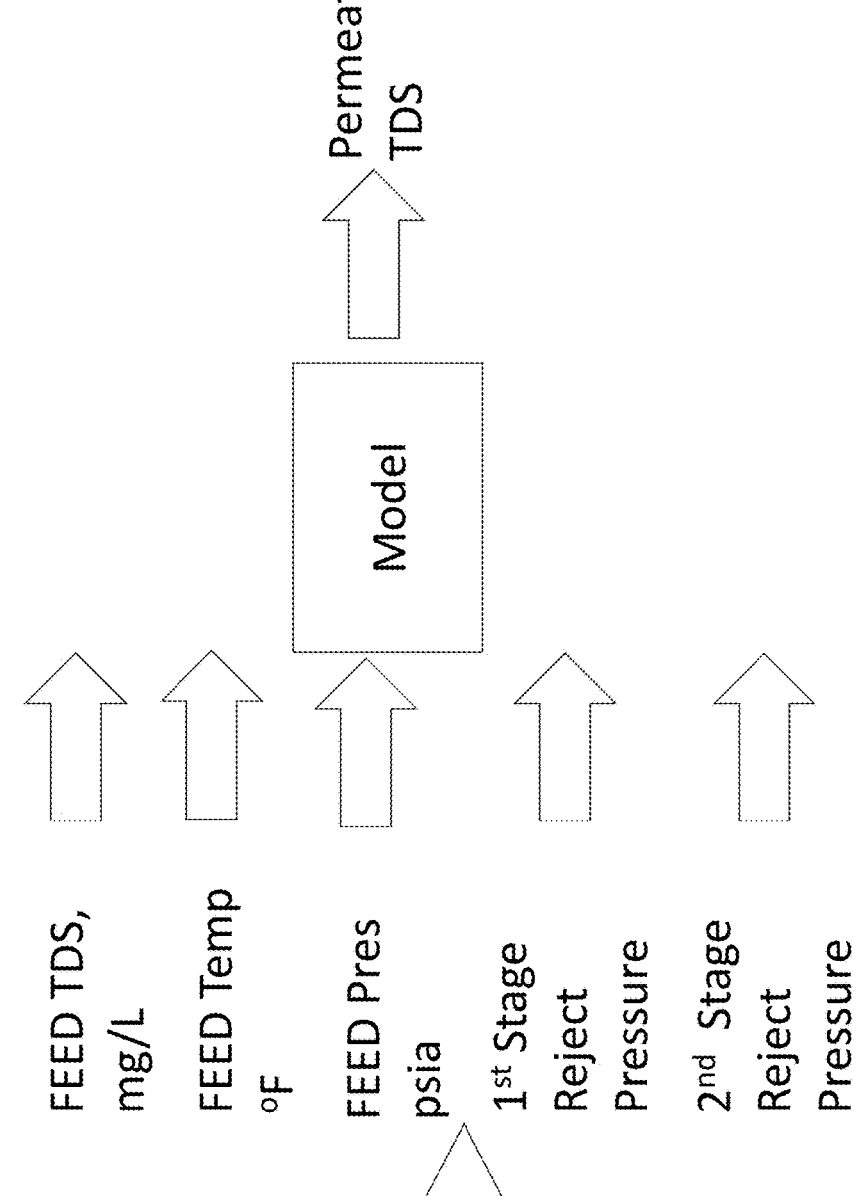
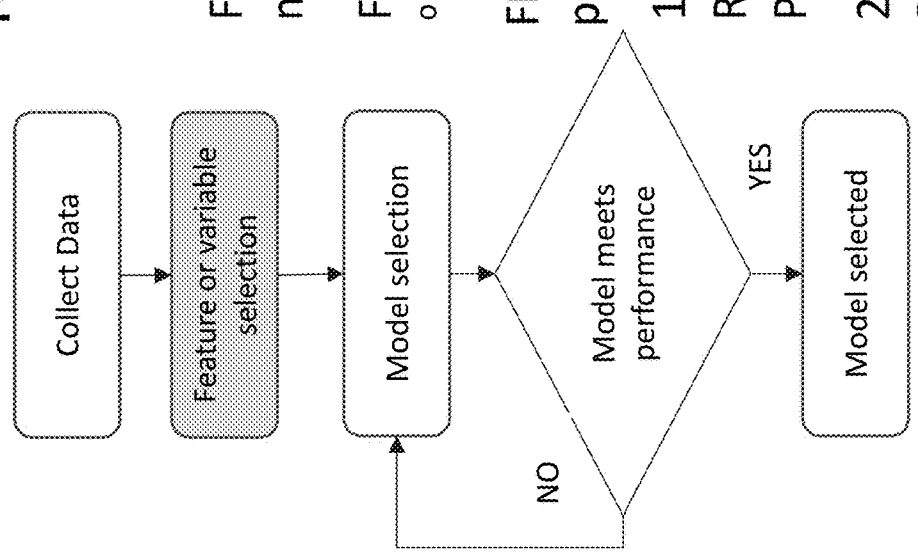
FIG. 10

Model Selection

Testing Models

Permeate TDS - 2PSRU mg/L

Model selected

Model Score: 0.99927515823211S3
Cross Validation Score: 0.9802111217918507
mean_squared_error:11487.9327S767273
absolute error: 107.181774372664436

Collect Data

Feature or variable selection

Model selection

Model meets performance

NO

YES

Model selected

Model Selection
Testing Models
Fouling Factor - 2PSRU mg/L
Model selected
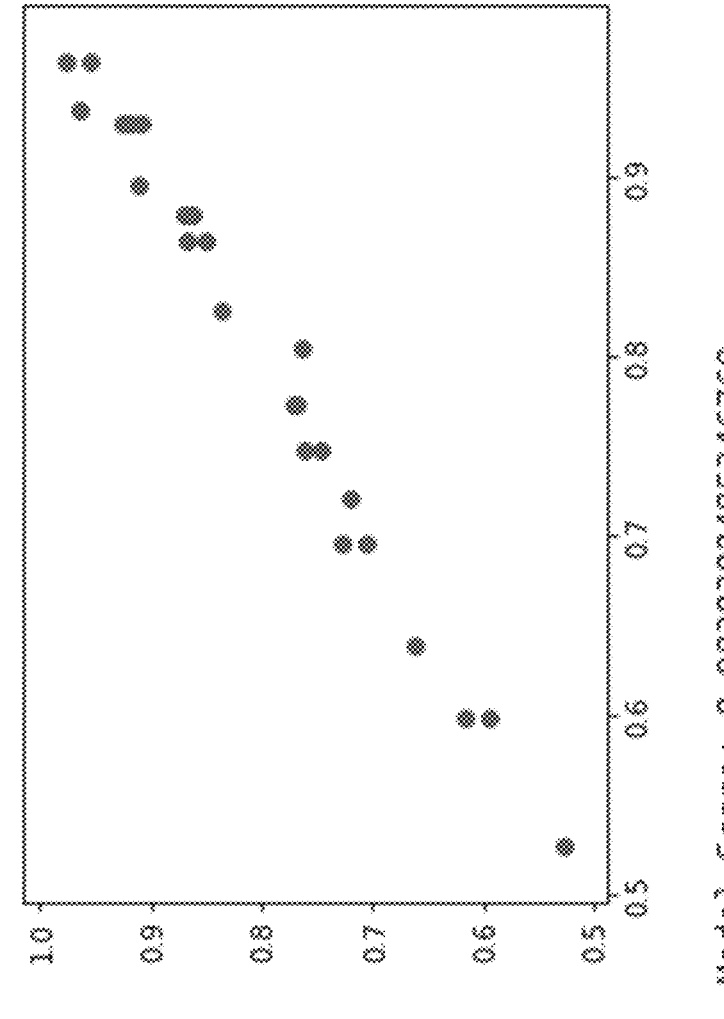
Model Score: 0.98303024853346769
bagging model score: 0.69201186436362515
mean_squared_error:0.000261566189794239
absolute error: 0.01617300806264063
FIG. 13B
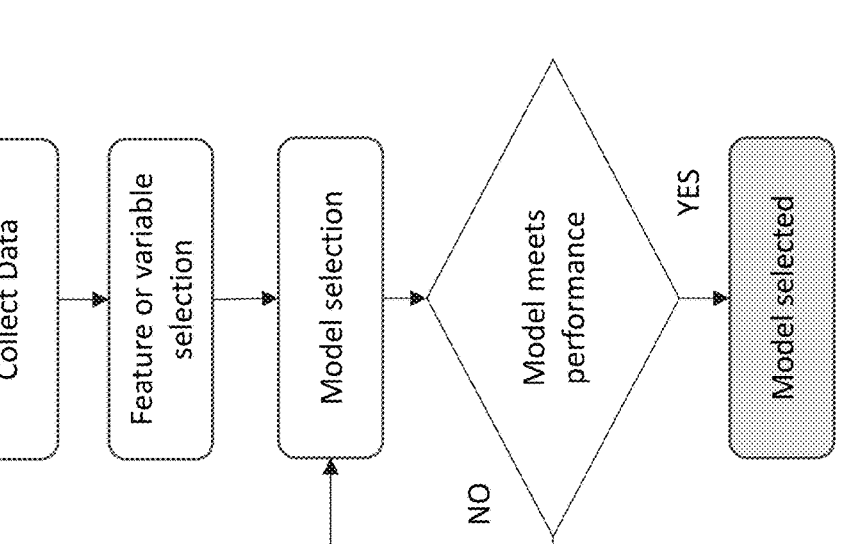

1500 obtaining synthetic data for a fluid treatment system from a data store, wherein the fluid treatment system comprises a membrane and the fluid treatment system is configured to receive a stream of fluid for treatment 1505 training a machine learning pressure prediction model using the synthetic data to predict a pressure for the membrane of the fluid treatment system; and wherein the trained pressure prediction model is combinable with an OTS model to update the OTS model to improve accuracy of simulation pressure data from the OTS model 1510 obtaining process data for the fluid treatment system after operation commences at the fluid treatment system from a data store; combining the process data with the synthetic data to generate hybrid data; and retraining the trained pressure prediction model using the hybrid data to form a retrained pressure prediction model 1520 obtaining a second target OTS model; and combining the retrained pressure prediction model with the second target OTS model to update the second target OTS model to form an updated second target OTS model, wherein combining includes providing the retrained pressure prediction for the membrane to the second target OTS model to form the updated second target OTS model 1525 obtaining a target OTS model from a data store; and combining the trained pressure prediction model with the target OTS model to update the target OTS model to form an updated target OTS model, wherein combining includes providing the pressure prediction for the membrane to the target OTS model to form the updated target OTS model 1515 running simulations using the updated target OTS model to generate target simulation pressure data with the updated target OTS model 1530 training a performance indicator model using the target simulation pressure data to predict a performance indicator for the fluid treatment system 1535

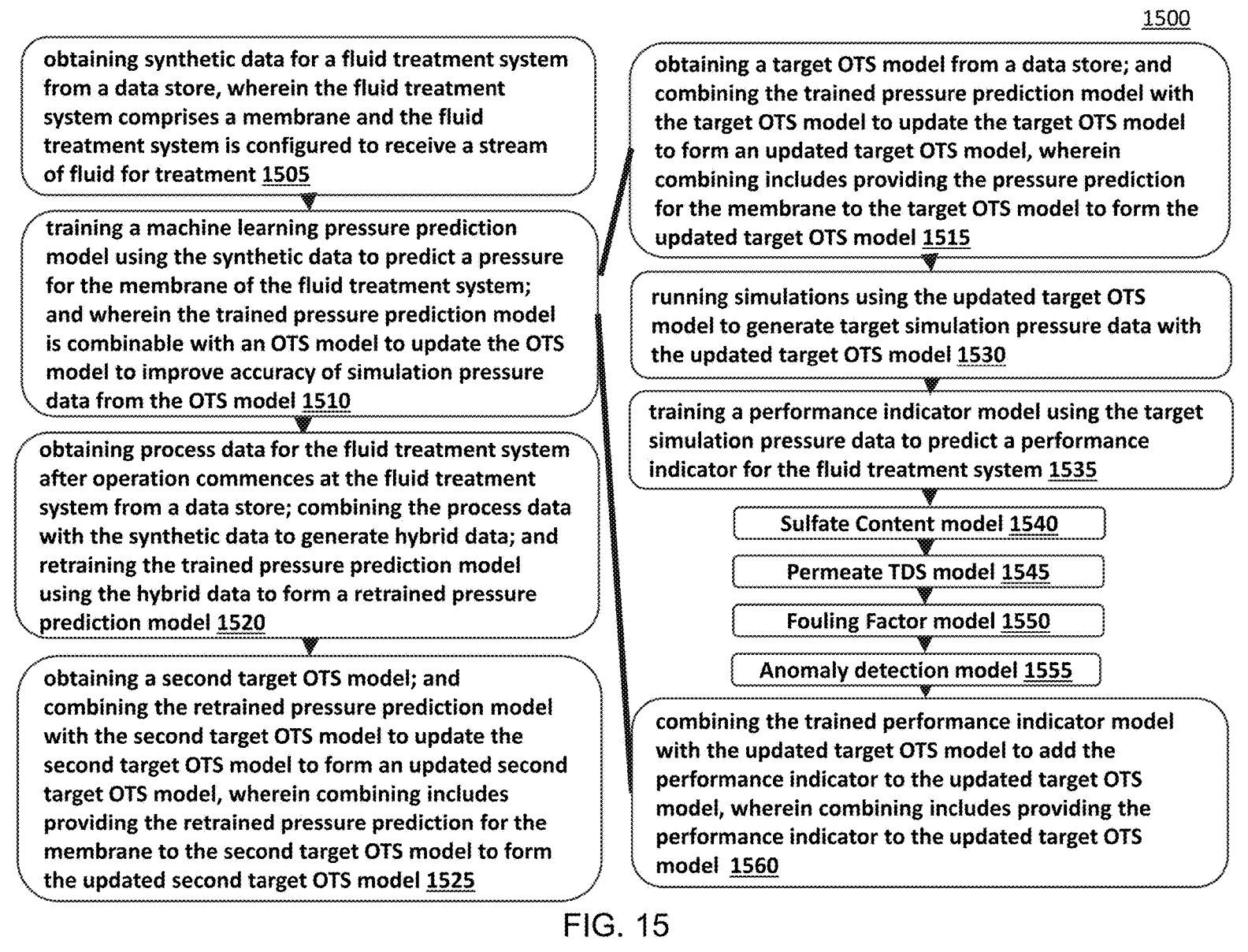

Sulfate Content model 1540

Permeate TDS model 1545

Fouling Factor model 1550

Anomaly detection model 1555 combining the trained performance indicator model with the updated target OTS model to add the performance indicator to the updated target OTS model, wherein combining includes providing the performance indicator to the updated target OTS model 1560

FIG. 15

Feature or Variable selection

Reject Pressure Stg2

Features        Model        Prediction

FEED TDS, mg/L

FEED Temp °F

FEED Pres psia

1st Stage Reject Pressure

2nd Stage Reject Pressure

Stg1 Flow (USGPM)

Model

Reject Pressure Stg2, psig

Collect Data → Feature or variable selection → Model selection → Model meets performance → YES → Model selected

NO

KPI validation after Re-training with OTS dataset

- OTS KPI validation after re-training - Permeate Sulfate

MODELLING OF A FLUID TREATMENT SYSTEM

CROSS-REFERENCE TO RELATED APPLICATIONS

This application claims benefit of U.S. Provisional Application No. 63/142,624, filed Jan. 28, 2021, which is hereby incorporated by reference in its entirety. This application claims benefit of U.S. Provisional Application No. 63/219, 185, filed Jul. 7, 2021, which is hereby incorporated by reference in its entirety.

STATEMENT REGARDING FEDERALLY SPONSORED RESEARCH OR DEVELOPMENT

Not applicable.

TECHNICAL FIELD

The disclosed embodiments relate generally to techniques of modelling a fluid treatment system, such as predicting a pressure for the membrane of the fluid treatment system and/or predicting a sulfate content value in a permeate stream.

BACKGROUND

Fluid treatment facilities, such as water treatment facilities, may include a membrane to mitigate reservoir souring and scaling. Current industrial practice relies on only pressure drop and a constant cleaning interval frequency to perform maintenance, which may result in reduced membrane life due to frequency cleaning or severe membrane fouling.

SUMMARY

In accordance with some embodiments, a method is provided that includes obtaining synthetic data for a fluid treatment system from a data store. The fluid treatment system comprises a membrane and the fluid treatment system is configured to receive a stream of fluid for treatment. The method also includes training a machine learning pressure prediction model using the synthetic data to predict a pressure for the membrane of the fluid treatment system. The trained pressure prediction model is combinable with an operator training simulator (OTS) model to update the OTS model to improve accuracy of simulation pressure data from the OTS model.

In accordance with some embodiments, a system is provided that includes a processor; and a memory communicatively connected to the processor, the memory storing computer-executable instructions which, when executed, cause the processor to perform a method. The method includes obtaining synthetic data for a fluid treatment system from a data store. The fluid treatment system comprises a membrane and the fluid treatment system is configured to receive a stream of fluid for treatment. The method also includes training a machine learning pressure prediction model using the synthetic data to predict a pressure for the membrane of the fluid treatment system. The trained pressure prediction model is combinable with an operator training simulator (OTS) model to update the OTS model to improve accuracy of simulation pressure data from the OTS model.

In accordance with some embodiments, a computer readable storage medium having computer-executable instructions stored thereon which, when executed by a computer, cause the computer to perform a method. The method includes obtaining synthetic data for a fluid treatment system from a data store. The fluid treatment system comprises a membrane and the fluid treatment system is configured to receive a stream of fluid for treatment. The method also includes training a machine learning pressure prediction model using the synthetic data to predict a pressure for the membrane of the fluid treatment system. The trained pressure prediction model is combinable with an operator training simulator (OTS) model to update the OTS model to improve accuracy of simulation pressure data from the OTS model.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

DESCRIPTION OF THE DRAWINGS

FIG. 6 illustrates one embodiment of a method consistent with the disclosure.

FIG. 7 illustrates one example of a method of feature or variable selection.

FIG. 10 illustrates one example of a method of feature or variable selection.

FIGS. 13A-13B illustrate two examples of fouling factor model selection, including at least one score and at least one error in each figure.

FIG. 15 illustrates another embodiment of a method consistent with the disclosure.

Figures 1A, 1B:
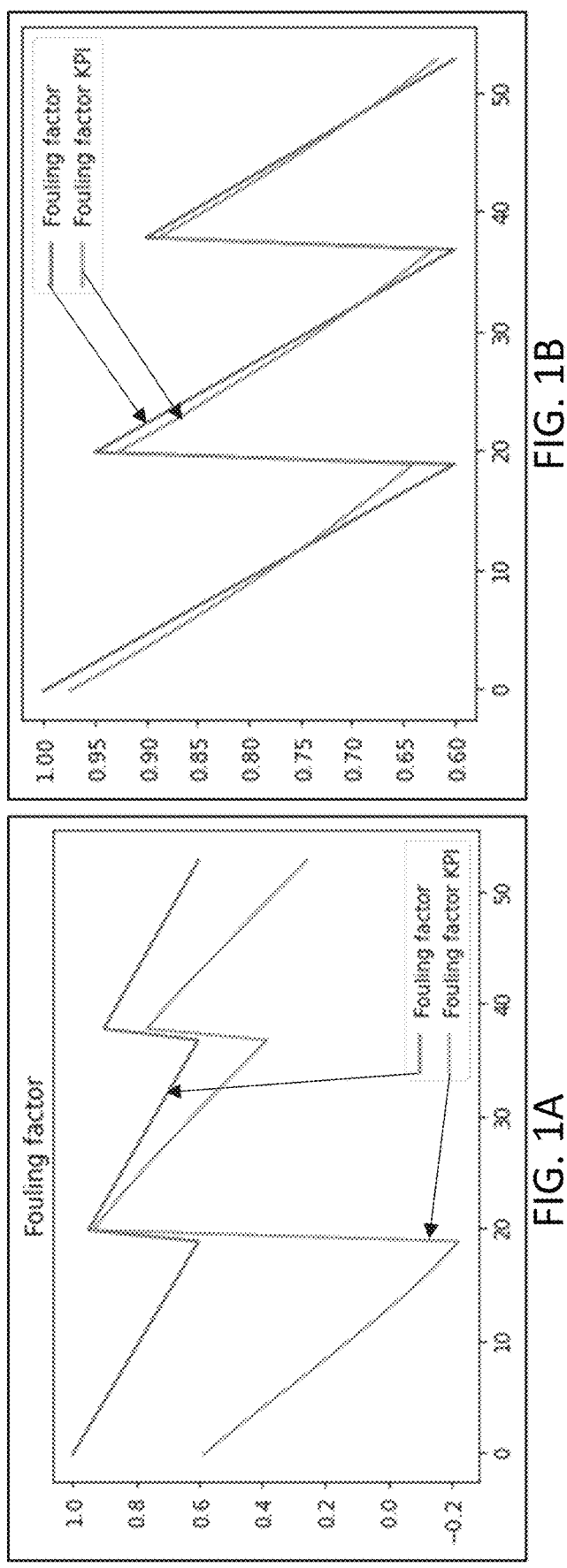
FIG. 1A illustrates one example diagram of a Fouling Factor without data augmentation.
FIG. 1B illustrates one example diagram of a Fouling Factor with data augmentation.

Reference will now be made in detail to various embodiments, where like reference numerals designate corresponding parts throughout the several views. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatuses have not been described in detail so as not to unnecessarily obscure aspects of the embodiments.

DETAILED DESCRIPTION

TERMINOLOGY: The following terms will be used throughout the specification and will have the following meanings unless otherwise indicated.

Subsurface Region: Hydrocarbon exploration processes, hydrocarbon recovery (also referred to as hydrocarbon production) processes, or any combination thereof may be performed on a subsurface region. The subsurface region refers to practically any volume under a surface. For example, the subsurface region may be practically any volume under a terrestrial surface (e.g., a land surface), practically any volume under a seafloor, etc. A water column may be above the subsurface region, such as in marine hydrocarbon exploration, in marine hydrocarbon recovery, etc. The subsurface region may be onshore. The subsurface region may be offshore (e.g., with shallow water or deep water above the subsurface region). The subsurface region may include faults, fractures, overburdens, underburdens, salts, salt welds, rocks, sands, sediments, pore space, etc. Indeed, the subsurface region may include practically any geologic point(s) or volume(s) of interest (such as a survey area) in some embodiments.

The subsurface region may include hydrocarbons, such as liquid hydrocarbons (also known as oil or petroleum), gas hydrocarbons (e.g., natural gas), solid hydrocarbons (e.g., asphaltenes or waxes), a combination of hydrocarbons (e.g., a combination of liquid hydrocarbons and gas hydrocarbons) (e.g., a combination of liquid hydrocarbons, gas hydrocarbons, and solid hydrocarbons), etc. The hydrocarbons may be discovered by hydrocarbon exploration processes.

The subsurface region may also include at least one well. For example, at least one well may be drilled into the subsurface region in order to confirm the presence of the hydrocarbons. As another example, at least one well may be drilled into the subsurface region in order to recover (also referred to as produce) the hydrocarbons. The hydrocarbons may be recovered from the entire subsurface region or from a portion of the subsurface region. For example, the subsurface region may be divided into one or more hydrocarbon zones, and hydrocarbons may be recovered from each desired hydrocarbon zone. One or more of the hydrocarbon zones may even be shut-in to increase hydrocarbon recovery from a hydrocarbon zone that is not shut-in. The subsurface region, the hydrocarbons, or any combination thereof may also include non-hydrocarbon items. For example, the non-hydrocarbon items may include connate water, brine, tracers, etc.

In short, each subsurface region may have a variety of characteristics, such as petrophysical rock properties, reservoir fluid properties, reservoir conditions, hydrocarbon properties, or any combination thereof. For example, each subsurface region (or even zone or portion of the subsurface region) may be associated with one or more of: temperature, porosity, salinity, permeability, water composition, mineralogy, hydrocarbon type, hydrocarbon quantity, reservoir location, pressure, etc. Indeed, those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, mineral, metal, a subsurface region having a permeability in the range of from 0.000001 millidarcy to 25 millidarcy (such as an unconventional subsurface region), a subsurface region having a permeability in the range of from 26 millidarcy to 40,000 millidarcy, etc.

The terms "subsurface region", "formation", "subsurface formation", "hydrocarbon-bearing formation", "reservoir", "subsurface reservoir", "subsurface region of interest", "subterranean reservoir", "subsurface volume of interest", "subterranean formation", and the like may be used synonymously. The terms "subsurface region", "hydrocarbons", and the like are not limited to any description or configuration described herein.

Well: A well refers to a single hole, usually cylindrical, that is drilled into the subsurface region for hydrocarbon exploration, hydrocarbon recovery, surveillance, or any combination thereof. The well is usually surrounded by the subsurface region and the well may be configured to be in fluidic communication with the subsurface region (e.g., via perforations in the well generated with a perforation gun). The well may also be configured to be in fluidic communication with the surface, such as in fluidic communication with a surface facility that may include oil/gas/water separators, gas compressors, storage tanks, pumps, gauges, sensors, meters, pipelines, etc.

The well may be used for injection (sometimes referred to as an injection well) in some embodiments. The well may be used for production (sometimes referred to as a production well) in some embodiments. The well may be used for a single function, such as only injection, in some embodiments. The well may be used for a plurality of functions, such as injection and production. The well may be drilled amongst existing wells, for example, as an infill well. A well may be utilized for injection and a different well may be used for hydrocarbon production, such as in the scenario that hydrocarbons are swept from at least one injection well towards at least one production well and up the at least one production well towards the surface for processing. On the other hand, a single well may be utilized for injection and hydrocarbon production, such as a single well used for hydraulic fracturing and hydrocarbon production. A plurality of wells (e.g., tens to hundreds of wells) are often used in a field to recover hydrocarbons).

The well may have straight, directional, or a combination of trajectories. For example, the well may be a vertical well, a horizontal well, a multilateral well, an inclined well, a slanted well, etc. The well may include a change in deviation. As an example, the deviation is changing when the well is curving. In a horizontal well, the deviation is changing at the curved section (sometimes referred to as the heel). As used herein, a horizontal section of a well is drilled in a horizontal direction (or substantially horizontal direction). For example, a horizontal section of a well is drilled towards the bedding plane direction. A horizontal section of a well may be, but is not limited to, a horizontal section of a horizontal well. On the other hand, a vertical well is drilled in a vertical direction (or substantially vertical direction). For example, a vertical well is drilled perpendicular (or substantially perpendicular) to the bedding plane direction.

The well may include a plurality of components, such as, but not limited to, a casing, a liner, a tubing string, a heating element, a sensor, a packer, a screen, a gravel pack, artificial lift equipment (e.g., an electric submersible pump (ESP)), etc. The "casing" refers to a steel pipe cemented in place during the well construction process to stabilize the well. The "liner" refers to any string of casing in which the top does not extend to the surface but instead is suspended from inside the previous casing. The "tubing string" or simply "tubing" is made up of a plurality of tubulars (e.g., tubing, tubing joints, pup joints, etc.) connected together. The tubing string is lowered into the casing or the liner for injecting a fluid into the subsurface region, producing a fluid from the subsurface region, or any combination thereof. The casing may be cemented in place, with the cement positioned in the annulus between the subsurface region and the outside of the casing. The well may also include any completion hardware that is not discussed separately. If the well is drilled offshore, the well may include some of the previous components plus other offshore components, such as a riser.

The well may also include equipment to control fluid flow into the well, control fluid flow out of the well, or any combination thereof. For example, each well may include a wellhead, a BOP, chokes, valves, or other control devices. These control devices may be located on the surface, under the surface (e.g., downhole in the well), or any combination thereof. In some embodiments, the same control devices may be used to control fluid flow into and out of the well. In some embodiments, different control devices may be used to control fluid flow into and out of the well. In some embodiments, the rate of flow of fluids through the well may depend on the fluid handling capacities of the surface facility that is in fluidic communication with the well. The control devices may also be utilized to control the pressure profile of the well.

The equipment to be used in controlling fluid flow into and out of the well may be dependent on the well, the subsurface region, the surface facility, etc. However, for simplicity, the term "control apparatus" is meant to represent any wellhead(s), BOP(s), choke(s), valve(s), fluid(s), and other equipment and techniques related to controlling fluid flow into and out of the well.

The well may be drilled into the subsurface region using practically any drilling technique and equipment known in the art, such as geosteering, directional drilling, etc. Drilling the well may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit are removed, and then the casing, the tubing, etc. may be installed according to the design of the well.

The equipment to be used in drilling the well may be dependent on the design of the well, the subsurface region, the hydrocarbons, etc. However, for simplicity, the term "drilling apparatus" is meant to represent any drill bit(s), drill string(s), drilling fluid(s), and other equipment and techniques related to drilling the well.

The term "wellbore" may be used synonymously with the terms "borehole," "well," or "well bore." The term "wellbore" is not limited to any description or configuration described herein.

Hydrocarbon recovery: The hydrocarbons may be recovered (sometimes referred to as produced) from the formation using primary recovery (e.g., by relying on pressure to recover the hydrocarbons), secondary recovery (e.g., by using water injection (also referred to as waterflooding) or natural gas injection to recover hydrocarbons), enhanced oil recovery (EOR), or any combination thereof. Enhanced oil recovery or simply EOR refers to techniques for increasing the amount of hydrocarbons that may be extracted from the formation. Enhanced oil recovery may also be referred to as tertiary oil recovery. Secondary recovery is sometimes just referred to as improved oil recovery or enhanced oil recovery. EOR processes include, but are not limited to, for example: (a) miscible gas injection (which includes, for example, carbon dioxide flooding), (b) chemical injection (sometimes referred to as chemical enhanced oil recovery (CEOR) that includes, for example, polymer flooding, alkaline flooding, surfactant flooding, conformance control, as well as combinations thereof such as alkaline-polymer (AP) flooding, surfactant-polymer (SP) flooding, or alkaline-surfactant-polymer (ASP) flooding), (c) microbial injection, (d) thermal recovery (which includes, for example, cyclic steam and steam flooding), or any combination thereof. The hydrocarbons may be recovered from the formation using a fracturing process. For example, a fracturing process may include fracturing using electrodes, fracturing using fluid (oftentimes referred to as hydraulic fracturing), etc. The hydrocarbons may be recovered from the formation using radio frequency (RF) heating. Another hydrocarbon recovery process(s) may also be utilized to recover the hydrocarbons. Furthermore, those of ordinary skill in the art will appreciate that one hydrocarbon recovery process may also be used in combination with at least one other recovery process or subsequent to at least one other recovery process. This is not an exhaustive list of hydrocarbon recovery processes.

Other definitions: The following abbreviations are utilized herein:

| Abbreviation | Definition |
| --- | --- |
| SRU | Sulfate Removal Unit |

-continued

| Abbreviation | Definition |
| --- | --- |
| KPIs | Key Performance Indicators |
| FF | Fouling Factor |
| TDS | Total Dissolved Solids |
| CIP | Clean in Place |
| OTS | Operator Training Simulator |
| MSE | Mean Square Error |
| MSA | Mean Absolute Error |
| LOF | Local Outlier Factor |
| MLP | Multi-Layer Perceptron |

The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

The term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

"Obtaining" may include one or more of accessing, acquiring, analyzing, determining, examining, identifying, loading, locating, opening, receiving, retrieving, reviewing, selecting, storing, and/or otherwise obtaining that item.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

Unless defined otherwise, all technical and scientific terms used herein have the same meanings as commonly understood by one of skill in the art to which the disclosed invention belongs. All citations referred herein are expressly incorporated by reference.

OVERVIEW: New water treatment facilities may include a seawater Sulfate Removal Unit (SRU) to mitigate reservoir souring and scaling. The general industry sulfate target for offshore SRU is usually 20 mg/L or even 40 mg/L; however, some facilities may require <10 mg/L of sulfate in injection water, which makes water quality monitoring more critical and challenging. Current industrial practice relies on only pressure drop and a constant cleaning interval frequency to perform SRU maintenance, which may result in reduced membrane life due to frequency cleaning or severe membrane fouling without the capability to predict fouling based on process conditions.

In contrast, the machine learning techniques applied herein may be used to fill the gap and deliver a prediction model(s) based on both simulation and real-time field data. The model(s) will track and monitor the system key performance indicators (KPIs) including pressure, membrane fouling factor (FF), permeate sulfate concentration, etc. The monitoring and prediction of these KPIs may provide estimates on when the next maintenance procedure is required, track membrane system status for troubleshooting and actions, and optimize membrane performance by tuning operation conditions.

The membrane (e.g., SRU) performance model(s) has been developed using synthetic data with machine learning techniques. The model(s) may be implemented as progress is made towards membrane (e.g., SRU) installation and commissioning. Machine learning models can be an effective way to model sulfate removal membranes. Synthetic data can be used to develop models and advance and incorporate a broader range of operation for each model. Data augmentation techniques may have a positive impact on model accuracy, model generalization, and the ability to use more complex models. KPI's provide the operator augmented information to help decision making in the field. Models (e.g., SRU models) can be integrated successfully into the OTS, providing training benefits for the operator and testing environment for the KPI's developed.

Models are provided herein to predict values depending on the specific implementation: (i) Fouling Factor, (ii) Permeate TDS, (iii) Permeate Sulfate, (iv) Anomaly Detection, and/or (v) Feed Pressure, Reject Pressure Stage 1, Reject Pressure Stage 2. These models may even be separated by passes depending on the specific implementation: (1) Fouling Factor First Pass, (2) Fouling Factor Second Pass, (3) Permeate TDS First Pass (4) Permeate TDS Second Pass, (5) Permeate Sulfate First Pass, (6) Permeate Sulfate Second Pass, (7) Anomaly Detection First Pass, (8) Anomaly Detection Second Pass, (9) Feed Pressure, Reject Pressure Stage 1, Reject Pressure Stage 2—First Pass, and/or (10) Feed Pressure, Reject Pressure Stage 1, Reject Pressure Stage 2—Second Pass.

Several opportunities have been identified to use these models: (a) Membrane Monitoring (such as real time or near real time membrane monitoring): These models provide additional information that help the operator to make the right decisions in terms of frequency for clean in place (CIP), identify rare events linked to membrane integrity or membrane performance, and back-up of critical analyzers like sulfate content analyzers. (b) Operator Training Simulator (OTS) Model Integration: Membrane models are vendor specific, therefore there are no off the shelves models that can be used on the OTS simulation software. This disclosure includes development of models that are more accurate and respond to membrane parameters instead of simulated differential pressure. The following paper is incorporated by reference: Flores, Lauren, Morles, Martin, and Cheng Chen. "Offshore Water Treatment KPIs Using Machine Learning Techniques." Paper presented at the SPE. Annual Technical Conference and Exhibition, Dubai, UAE, September 2021. doi: https://doi.org/10.2118/206173-MS.

MEMBRANE MONITORING: The operation of water processing equipment related to membrane processes is not predictive (more reactive troubleshooting) and this can result in poor reliability, frequent maintenance, and high operating expenses. The membranes will be chemically cleaned on a constant frequency and the key process operating parameters such as flux and back pressure are controlled at fixed value per design. Typically, the predominant indicator for membrane cleaning or replacement is only to utilize differential pressure. This is standard practice that is implemented across industry. However, only utilizing differential pressure overlooks many factors that influence membrane performance and does not provide opportunities for membrane process optimization.

Advantageously, the machine learning analytics provided herein may include the following factors: feed water composition, temperature, conductivity, flux distribution and fouling. For example, optimizing membrane flux or permeate pressure can better balance flow between stages and achieve optimal membrane life, which optimizes availability, reliability, and reduces operating expenses. In the membrane monitoring context, the machine learning based models may lead to: KPIs that may provide information about membrane performance and/or a model for sulfate content prediction to reduce risk of souring the reservoir and to serve as a back-up to a sulfate content analyzer.

Advantageously, embodiments consistent with the instant disclosure may also avoid unnecessary membrane cleaning and help optimize chemical treatment such as biocide and antiscalant, which reduces the chemical usage and reduces chemical treatment expenses. This may result in extended membrane life, improved process reliability, and OPEX reduction, especially during the multi-decade life of a field. This cost savings does not factor in the reduced OPEX savings from utilization of embodiments consistent with the instant disclosure. The solution may help optimize chemical cleaning and extend membrane lifetime—which directly reduces operational expenses. The replacement of a SRU membrane may be substantial, for example.

Advantageously, embodiments consistent with the instant disclosure may also minimize/avoid false alarm of off-specification sulfate, which has potential to trigger facility shut-down and reduce unnecessary loss of potential oil—which is important to provide validation of the sulfate content analyzer. Moreover, embodiments consistent with the instant disclosure may be used and tailored for practically any project involving fluid/water processing across the enterprise, for example, offshore, onshore, platform, etc. The treated fluid may be injected into a well for waterflooding, another hydrocarbon recovery process, or other fluid/water treatment process.

Advantageously, membrane monitoring may be in real time (or near real time) in some embodiments.

The general industry sulfate target for offshore SRU is usually 20 mg/L or even 40 mg/L; however, some facilities may require <10 mg/L of sulfate, which makes water quality monitoring more critical and challenging. Advantageously, embodiments consistent with the instant disclosure may be utilized to achieve an effluent sulfate target ≤10 ppm.

Turning to FIG. 6, at step 605, the method 600 includes obtaining synthetic data for a fluid treatment system from a data store. Synthetic data may include engineering cases as well as data generated through data augmentation techniques. The fluid treatment system comprises a membrane and the fluid treatment system is configured to receive a stream of fluid for treatment. In some embodiments, the fluid treatment system comprises a plurality of ultrafiltration membranes, a plurality of sulfate removal membranes, or any combination thereof. In some embodiments, the stream of fluid for treatment comprises hydrocarbon, sea water, brackish water, flowback water, produced fluid, reclaimed or recycled water, brine (e.g., reservoir or synthetic brine), fresh water (e.g., fresh water comprises <1,000 ppm TDS water), slickwater, or any combination thereof. In some embodiments, the stream of fluid for treatment has a temperature of less than or equal to 45° C. In some embodiments, the stream of fluid for treatment has sulfate of >20 mg/L. The general industry sulfate target for offshore SRU is usually 20 mg/L or even 40 mg/L; however, some facilities may require <10 mg/L of sulfate, which makes water quality monitoring more critical and challenging. Thus, in some embodiments, the fluid treatment system may have a effluent sulfate target ≤10 ppm. In some embodiments, the treatment of the stream of fluid has not commenced in the fluid treatment system at step 605.

Figure 23:
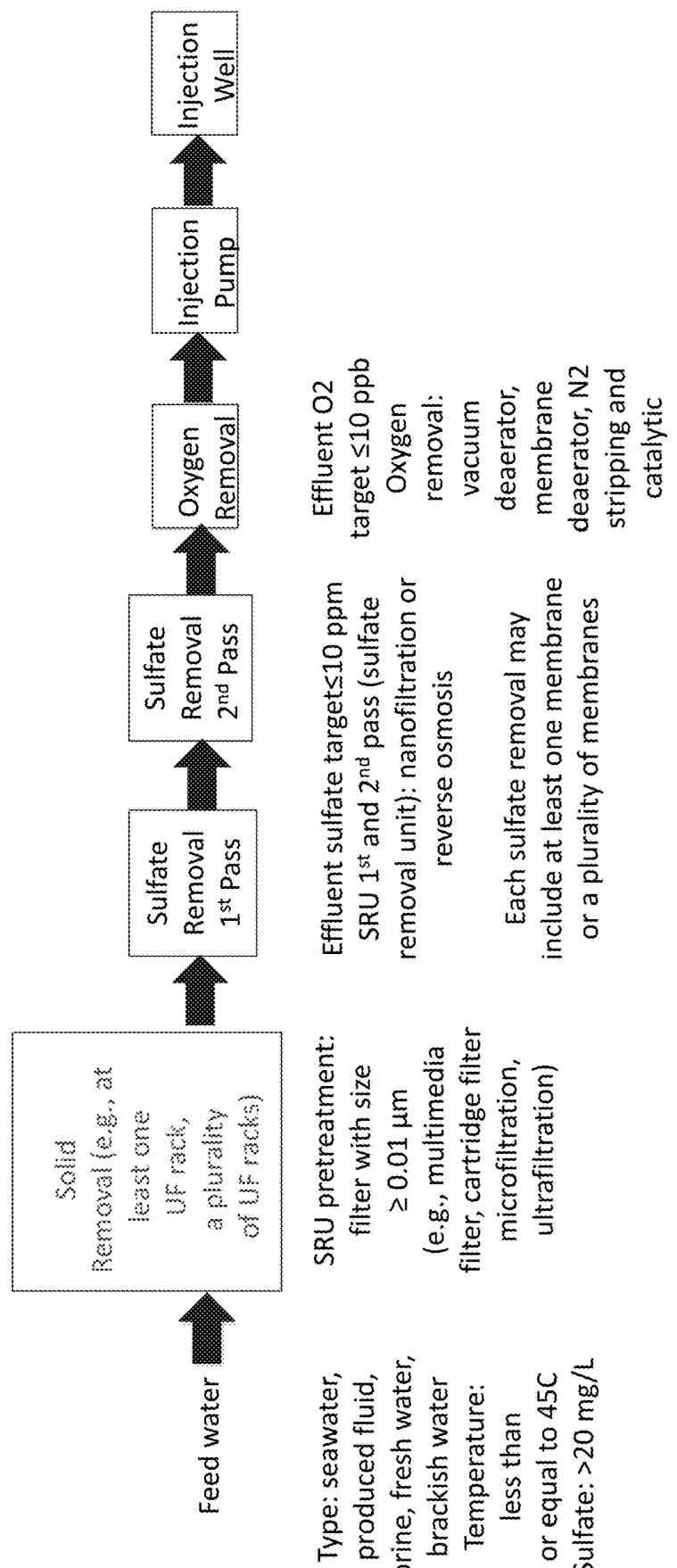
FIG. 23 illustrates one embodiment of a fluid treatment system.

For example, one embodiment of the fluid treatment system is illustrated in FIG. 23. Regarding membrane stages: In a one stage RO system, the feed water enters the RO system as one stream and exits the RO as either concentrate or permeate water. In a two-stage system the concentrate (or reject) from the first stage then becomes the feed water to the second stage. The permeate water is collected from the first stage is combined with permeate water from the second stage. Additional stages increase the recovery from the system. There is only one feed pump no matter how many stages.

Regarding membrane passes: A "pass" shall be seen as a standalone RO system. The difference between a single pass RO system and a double pass RO system is that with a double pass RO, the permeate from the first pass becomes the feed water to the second pass (or second RO) which ends up producing a much higher quality permeate because it has essentially gone through two RO systems. Each pass will have its own feed pump and shall include one or more stages.

For example, the synthetic data may include a set of membrane performance data generated from commercial membrane simulation software (e.g., for SRU) and/or generated from physical membrane modeling (e.g., for UF). The synthetic data for the SRU may include, but is not limited to: Feed Temperature (° F.), Feed TDS (Mg/L), Fouling Factor, Membrane age (years), Permeate Pressure (psi), or any combination thereof. The synthetic data for the UF may include, but is not limited to: Inlet Temperature (° F.), Irreversible Fouling factor, TSS (mg/L), BW active, Flow (BWPD), Data Counts (Filter time in Min), or any combination thereof. The dataset for machine learning model when production data is not available may include: (a) Feed and permeate TDS: total dissolved solids in mg/L and/or (b) Feed, reject and permeate pressure: in psig. Synthetic data may include engineering cases as well as data generated through data augmentation techniques.

For example, the first step is to obtain membrane data (e.g., SRU data) for the prediction model to predict the sulfate content value in the permeate stream in the fluid treatment system. As the membrane (e.g., SRU) has not been installed, a membrane simulation tool may be applied to generate hundreds of membrane performance data under various operating conditions. A data augmentation technique may be applied to expand the data (e.g., 60 cases original to 60,000 case final dataset) for training. For data augmentation, a simple model using Linear Bayesian Regressors or other technique may be generated, then gaussian noise may be added to the independent variables, initial models may be used to fill the gap, and every case may be expanded (e.g., every case may be expanded 1000 times), The membrane simulation tool may be supplied by a membrane vendor(s) governed by the solvent (water) and solute (dissolved inorganic ions) mass transport equations. More information may be found in C. Chen, X. Huang, P. Prakash, S. Chilekar and R. Franks, "Produced water desalination using high temperature membranes," *Desalination*, vol. 513, p. 115144, 2021, which is incorporated by reference.

At step 610, the method 600 includes training a performance indicator model using the synthetic data to predict a performance indicator for the fluid treatment system. The performance indicator comprises a permeate sulfate performance indicator and the performance indicator model predicts a sulfate content value in a permeate stream. Permeate Sulfate (mg/L): This variable reduces the operational risk of souring the reservoir serving as a back-up of the sulfate content analyzer. In some embodiment, a single Permeate Sulfate model may be trained for the prediction. In some embodiments, a Permeate Sulfate First Pass model and a Permeate Sulfate Second Pass model may be trained for the prediction. In some embodiments, the performance indicator model continuously predicts the sulfate content value in the permeate stream. In some embodiments, the performance indicator model predicts a single sulfate content value or a plurality of sulfate content values in the permeate stream. One or more machine learning techniques may be utilized for the training, such as, but not limited to, linear regression, ridge regression, ridge regression with built in cross validation, decision tree regressor, and/or bagging (bootstrap aggregation) techniques In some embodiments, training the performance indicator model for the permeate sulfate performance indicator comprises: performing feature selection for variables associated the permeate sulfate indicator using the synthetic data to select the features; generating a plurality of performance indicator models for the permeate sulfate performance indicator using the selected features; and selecting a performance indicator model from the plurality of performance indictor models for the permeate sulfate performance indicator. Thus, the next step may be to use the synthetic data for Permeate Sulfate model selection, training, and validation. In some embodiments, Multi-Layer Perceptron (MLP) may be utilized to train the Permeate Sulfate model.

Figure 7:
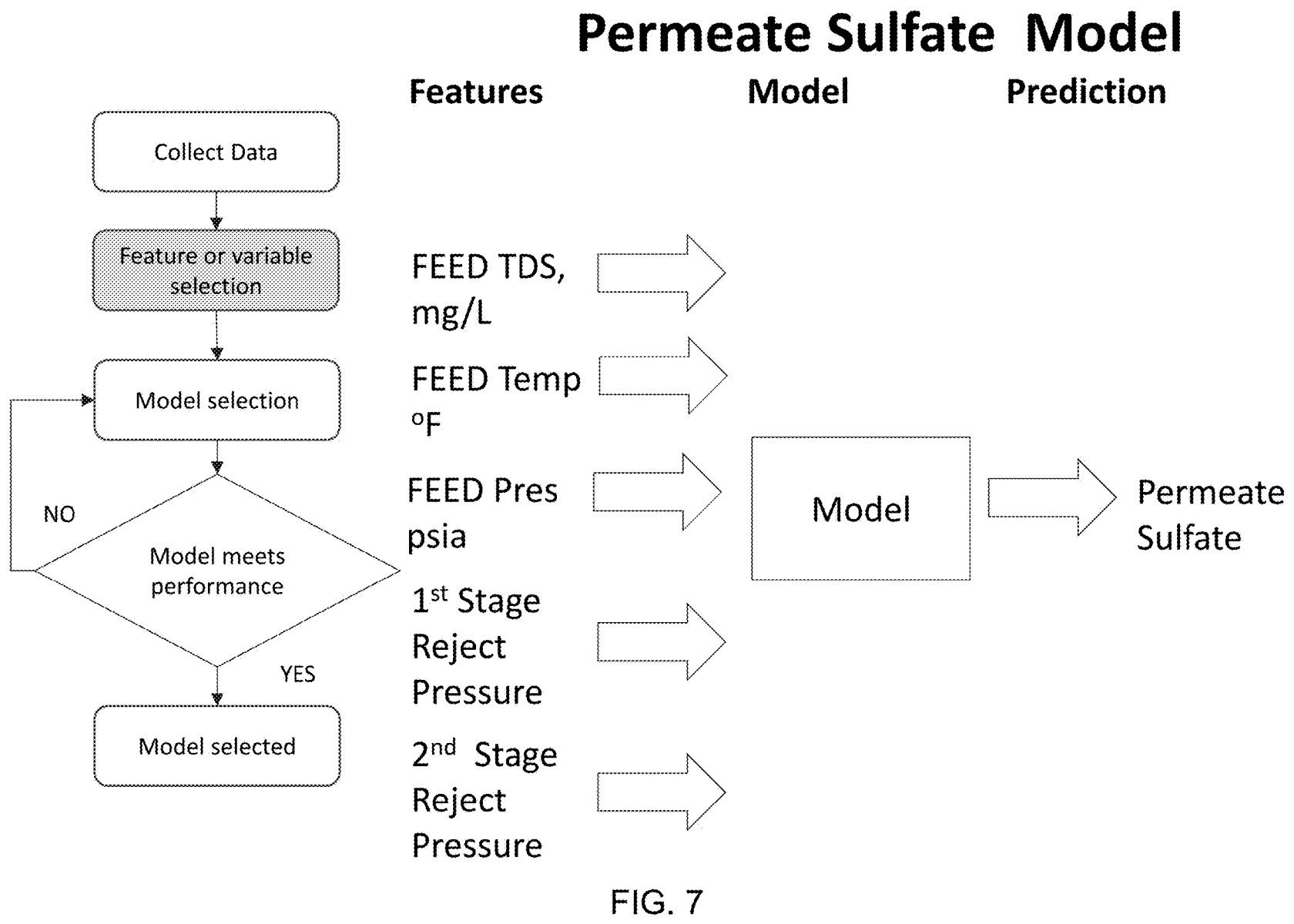

FIG. 7 illustrates one example of a method of feature or variable selection. The collecting data step refers to FIG. 6, step 605. As explained hereinabove, the synthetic data may be utilized because operations have not commenced at the facility. As illustrated in FIG. 7, feature or variable selection for the Permeate Sulfate Model may include (a) features such as FEED TDS (mg/L), FEED Temp (° F.), FEED Pres (psia), $1^{st}$ Stage Reject Pressure, and $2^{nd}$ Stage Reject Pressure.

Figure 8A:
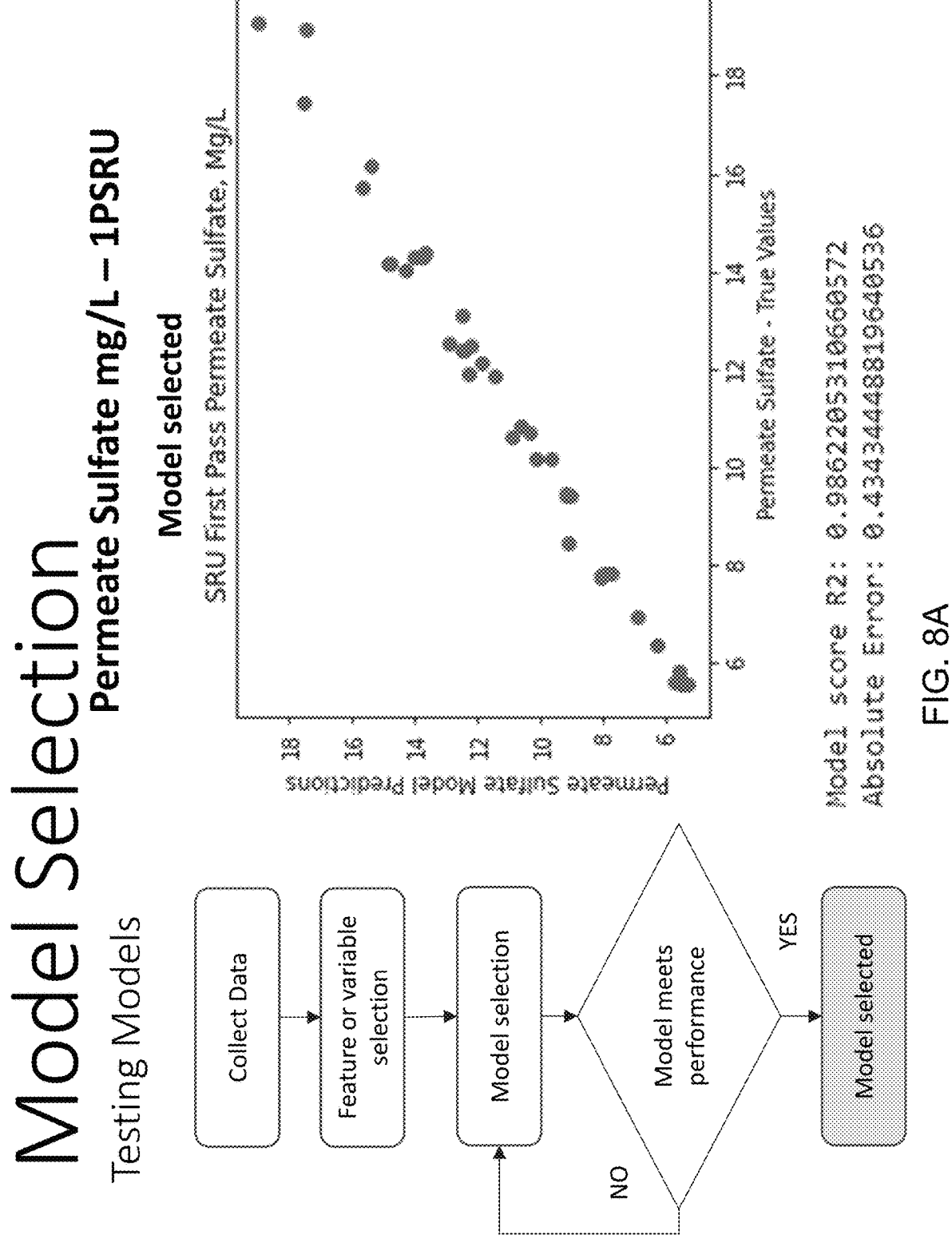
FIGS. 8A-8B illustrate two examples of Permeate Sulfate model selection, including at least one score and at least one error in each figure.
Figure 8B:
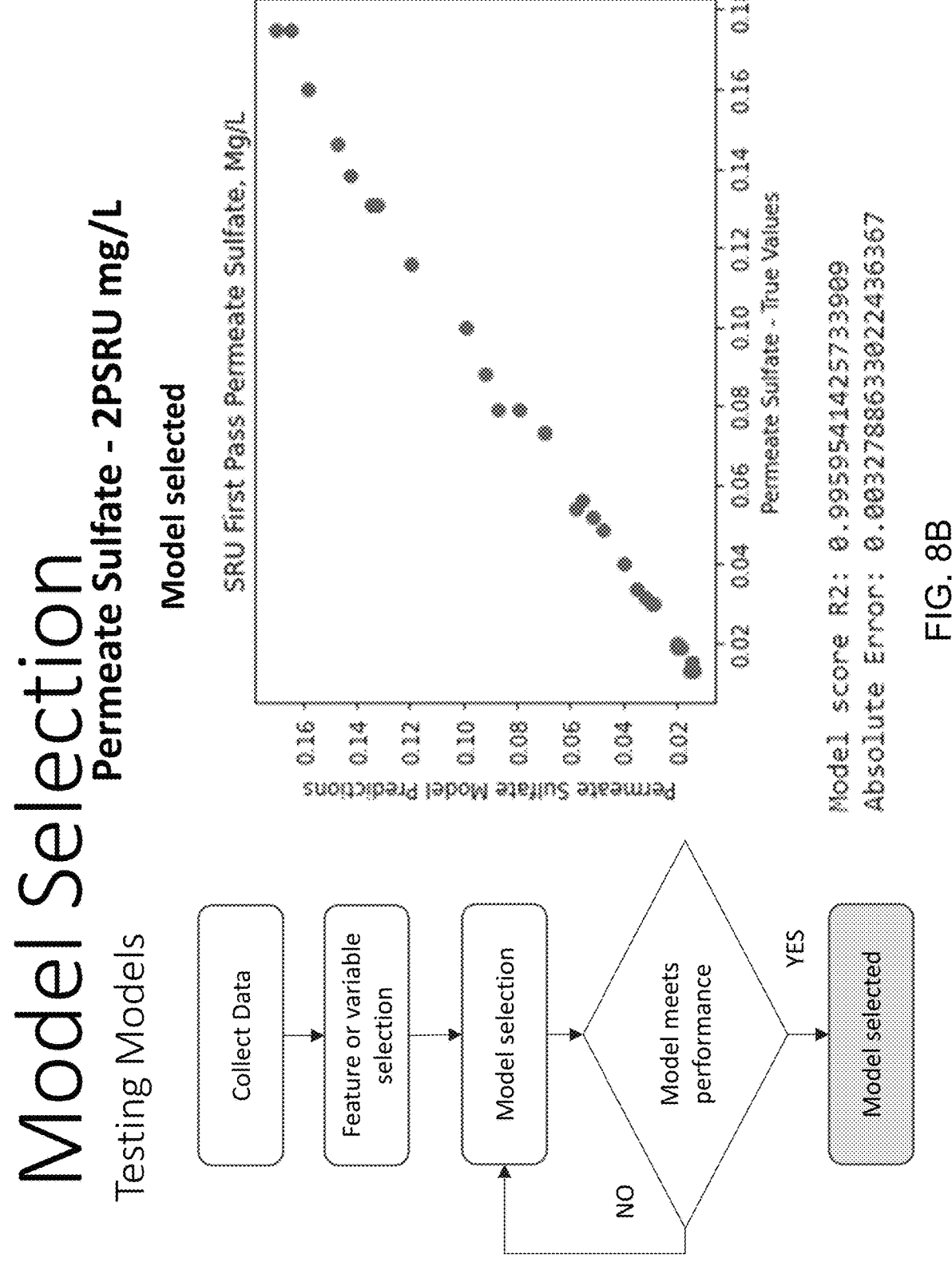

FIGS. 8A-8B illustrate two examples of Permeate Sulfate model selection, including at least one score and at least one error in each figure. In some embodiments, each model of the plurality of performance indicator models comprises a corresponding score. The performance indicator model for the permeate sulfate performance indicator is selected based on the corresponding score. In some embodiments, at least one corresponding score comprises an error score. Several Permeate Sulfate models may be evaluated using training data and the model scores are compared to select the best model. Metrics such as model error (test error), cross-validation error, absolute error, or any combination thereof may be utilized to select among the several Permeate Sulfate models. Split data and cross validation techniques helps to assess how good is the model to generalize when new input data is added. Indeed, metrics may be used to determine the best model that fit the data employed; however, extensive validation and sensitivity analysis may be used to understand the model capability of generalization. The metrics that may be used are as follows:

Model Score or Coefficient of Determination $R^2$: "It represents the proportion of variance (of y) that has been explained by the independent variables in the model. It provides an indication of goodness of fit and therefore a measure of how well unseen samples are likely to be predicted by the model, through the proportion of explained variance." (Fabian Pedregosa, et al. "Scikit-learn: Machine Learning in Python," *Journal of Machine Learning Research*, vol. 12, pp. 2825-2830, 2011, which is incorporated by reference).

Mean Square Error (MSE): "The mean_squared_error function computes mean square error, a risk metric corresponding to the expected value of the squared (quadratic) error or loss" (Fabian Pedregosa, et al. "Scikit-learn: Machine Learning in Python," *Journal of Machine Learning Research*, vol. 12, pp. 2825-2830, 2011, which is incorporated by reference).

Mean Absolute Error (MSA): "The mean_absolute_error function computes mean absolute error, a risk metric corresponding to the expected value of the absolute error loss or—norm loss." (Fabian Pedregosa, et al. "Scikit-learn: Machine Learning in Python," *Journal of Machine Learning Research*, vol. 12, pp. 2825-2830, 2011, which is incorporated by reference).

Machine learning was applied to expand the dataset and make the model more robust to adapt more variations: (a) Supervised Learning, also known as supervised machine learning, and refers to a subcategory of machine learning and artificial intelligence defined by its use of labeled datasets to train algorithms to classify data or predict outcomes accurately. (b) Unsupervised Learning that uses unlabeled data and from that unlabeled data, it discovers patterns that help solve for clustering or association problems. (c) Model Generalization that refers to the model's ability to adapt properly to new, previously unseen data, drawn from the same distribution as the one used to create the model. (d) Data Augmentation is used to increase the amount of data by adding slightly modified copies of already existing data or newly created synthetic data from existing data. Once the model is chosen and built, a separate data set other than training data was used to validate the model.

After operation commences at the fluid treatment system, at step 615, the method 600 includes obtaining process data (e.g., field data) for the fluid treatment system after operation commences at the fluid treatment system from a data store; combining the process data with the synthetic data to generate hybrid data; and retraining the trained performance indicator model using the hybrid data to form a retrained performance indicator model. For example, a hybrid dataset may have data for off-design cases and field data for model accuracy. Those of ordinary skill in the art will appreciate that the control may pass from step 610 to this step 615, or alternatively, control may pass from any of steps 625, 630, 635, or 640 to this step 615. For example, after the membrane (e.g., SRU) is online and producing real-time data, the real data may be used to adjust model parameters.

Figure 9A:
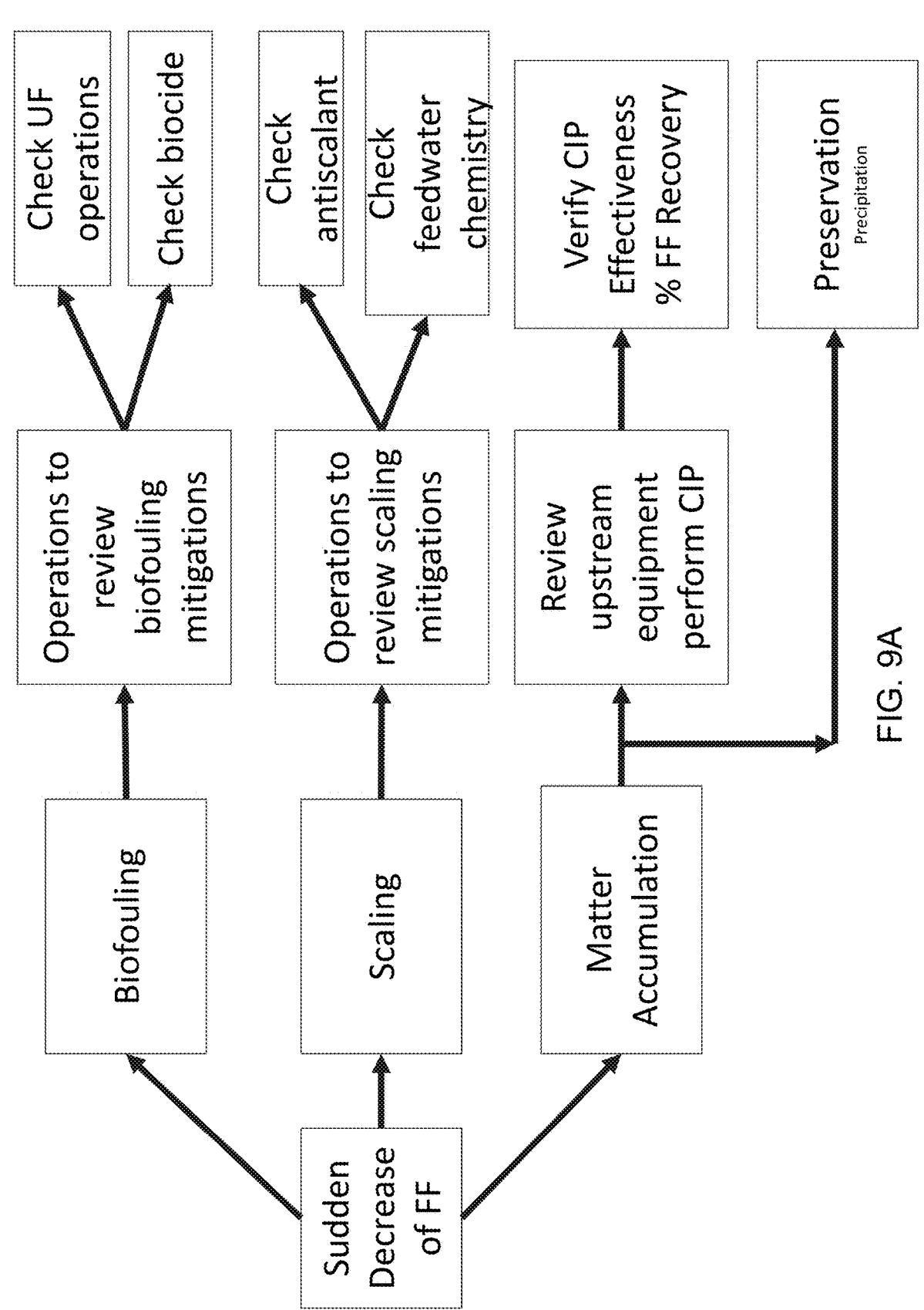
FIGS. 9A-9B illustrate example methods of maintenance recommendations that may be provided via a display.
Figure 9B:
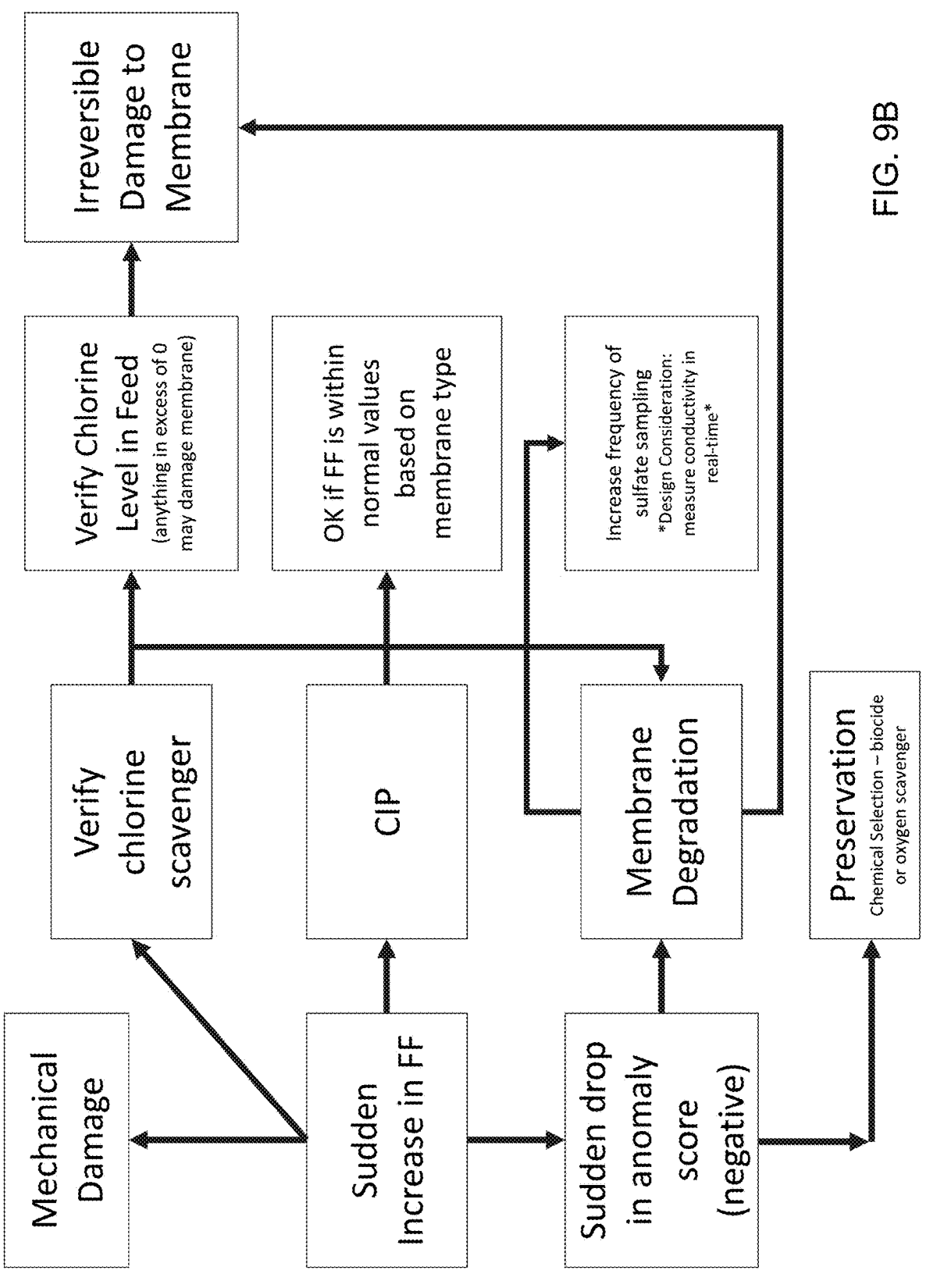

At step 620, the method 600 includes generating a maintenance recommendation for the membrane based on a predicted sulfate content value in the permeate stream, a predicted fouling factor value for the membrane (discussed hereinbelow in connection with step 635), a predicted TDS content value in the permeate stream (discussed hereinbelow in connection with step 630), or any combination thereof. In some embodiments, the maintenance recommendation comprises chemical cleaning (e.g., days to Clean in Place (CIP)/optimum frequency for Clean in Place (CIP) as in FIG. 4), membrane replacement, chemical agent adjustment (e.g., change in quantity of a chemical agent to inject, change in type or composition of chemical agent to inject, recommend addition of a new chemical agent), initiate backwash, or any combination thereof. Those of ordinary skill in the art will appreciate that the control may pass from step 615 to this step 620, control may pass from steps 625, 630, 635, or 640 to this step 620. FIGS. 9A-9B illustrate example methods of maintenance recommendations that may be provided.

Those of ordinary skill in the art will appreciate that various modifications may be made to the method 600. For example, optionally, at step 625, the method 600 includes obtaining second synthetic data from a data store; and generating, with the performance indicator model, a predicted sulfate content value in the permeate stream based on the second synthetic data. The additional synthetic data may increase the accuracy of the sulfate content prediction, and it may be utilized before or after step 615 and/or 620 depending on the implementation.

Figure 11A:
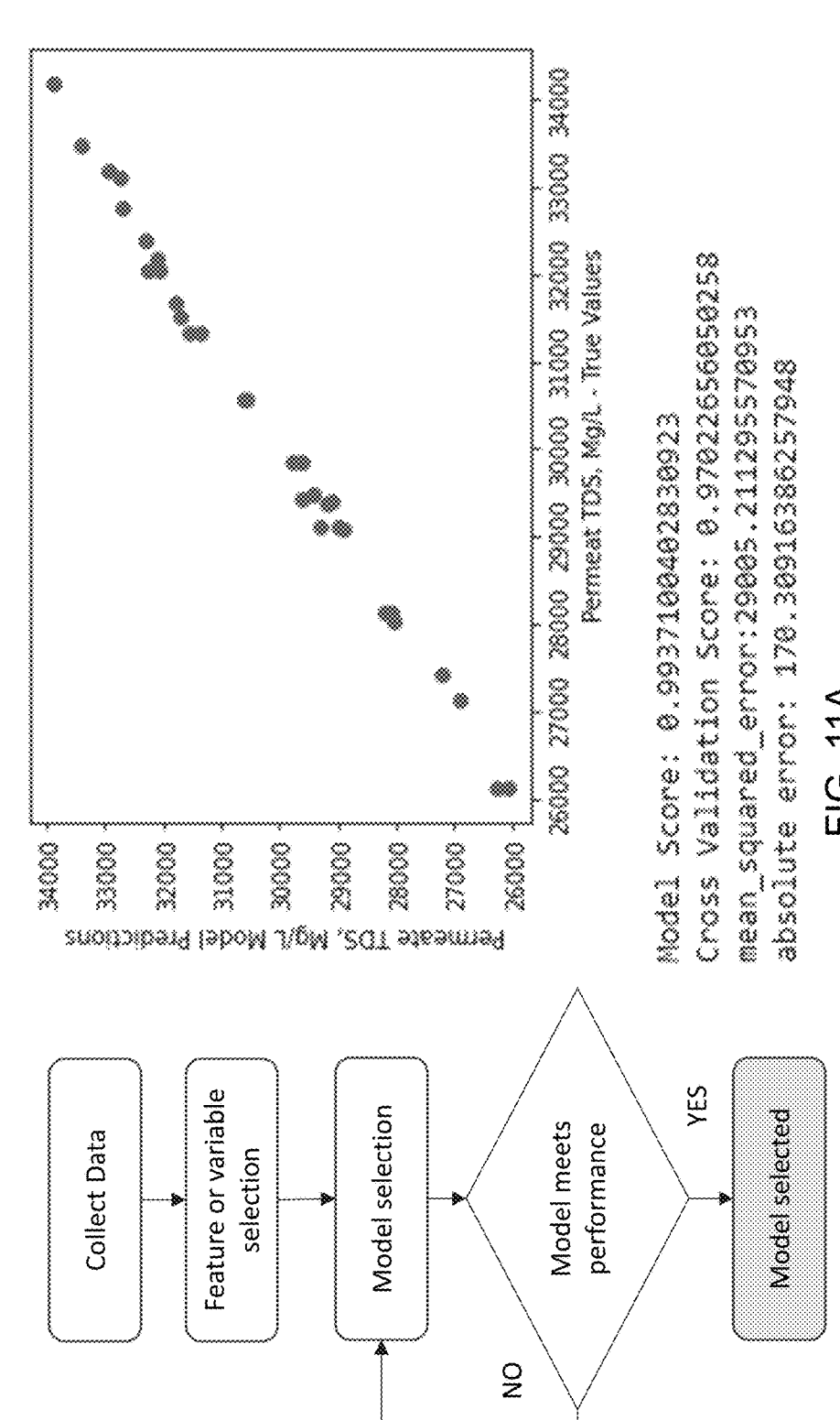
FIGS. 11A-11B illustrate two examples of Permeate TDS model selection, including at least one score and at least one error in each figure.
Figure 11B:

Optionally, the performance indicator comprises a permeate total dissolved solids (TDS) performance indicator and the performance indicator model predicts a TDS content value in the permeate stream. Permeate TDS (mg/L): This variable can be an indicator of membrane degradation as a back-up for a sulfate content analyzer. For example, optionally, at step 630, the method 600 may include training a separate permeate TDS model in a similar manner as described hereinabove to predict a TDS content value in the permeate stream. In some embodiments, Multi-Layer Perceptron (MLP) may be utilized to train the Permeate TDS model. In some embodiment, a single Permeate TDS model may be trained for the prediction. In some embodiments, a Permeate TDS First Pass model and a Permeate TDS Second Pass model may be trained for the prediction. FIG. 10 illustrates one example of a method of feature or variable selection. FIGS. 11A-11B illustrate two examples of Permeate TDS model selection, including at least one score and at least one error in each figure. Furthermore, the method 600 may also include obtaining second synthetic data from a data store; and generating, with the performance indicator model, a predicted TDS content value in the permeate stream based on the second synthetic data.

Figure 12:
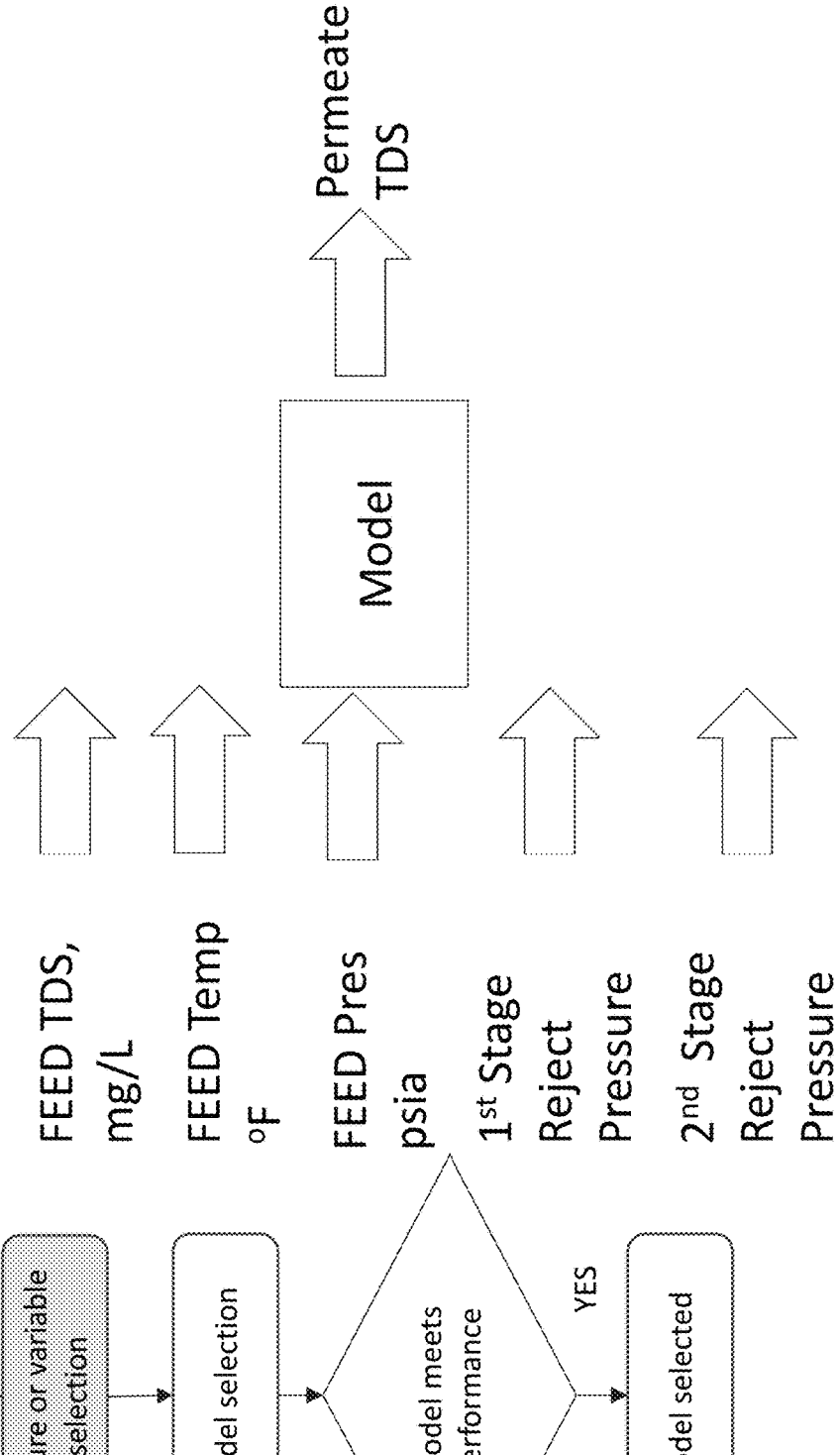
FIG. 12 illustrates one example of a method of feature or variable selection.
Figure 13A:
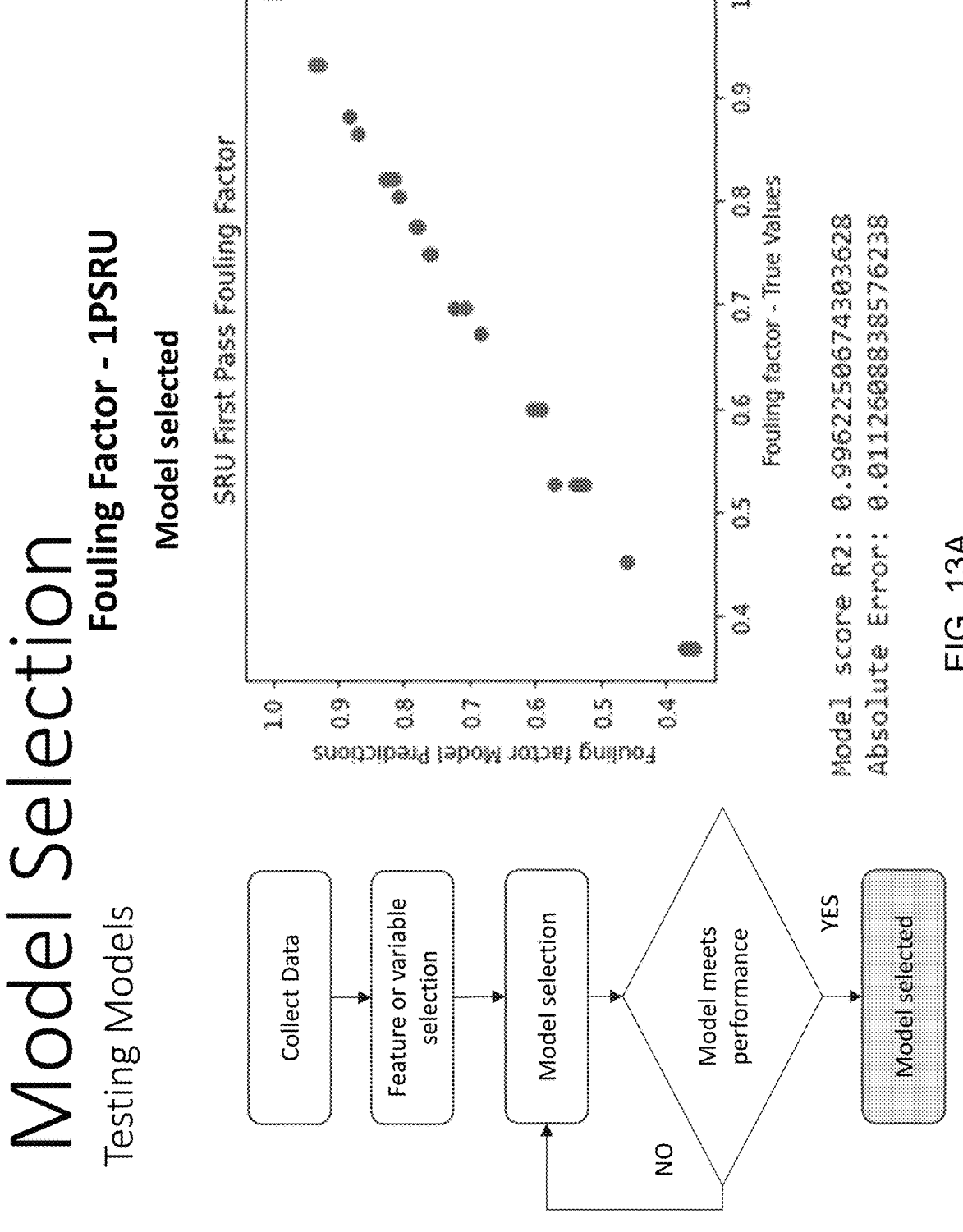

Optionally, the performance indicator comprises a fouling factor performance indicator and the performance indicator model predicts a fouling factor value for the membrane, Fouling Factor: This variable provides indication of membrane fouling risk which cannot be measured directly. For example, optionally, at step 635, the method 600 may include training a separate fouling factor model in a similar manner as described hereinabove to predict a fouling factor value for the membrane. In some embodiments, Multi-Layer Perceptron (MLP) may be utilized to train the Fouling Factor model. In some embodiment, a single Fouling Factor model may be trained for the prediction. In some embodiments, a Fouling Factor First Pass model and a Fouling Factor Second Pass model may be trained for the prediction. FIG. 12 illustrates one example of a method of feature or variable selection. FIGS. 13A-13B illustrate two examples of fouling factor model selection, including at least one score and at least one error in each figure. Furthermore, the method 600 may also include obtaining second synthetic data from a data store; and generating, with the performance indicator model, a predicted fouling factor value for the membrane based on the second synthetic data.

Prior to establishing KPI models, several key model input and output parameters were identified. The input parameters are the values that can be measured directly including feed temperature, feed and permeate total dissolved solids (TDS), feed and reject pressures, etc. The output parameters are predicted membrane pressures (see FIG. 15), fouling factors and permeate sulfate concentrations. Membrane fouling occurs when contaminants accumulate on the membrane surface effectively plugging the membrane. Fouling does not necessarily reduce salt rejection, but it will increase pressure drop. For membrane fouling monitoring, the current industrial practice mostly focuses on ΔP, differential pressure across membrane elements or pressure vessels. However, this practice overlooks the impact of other parameters on pressure drop, such as temperature, which may lead to wrong decisions.

Here fouling factor was used instead to reflect the true picture of membrane fouling and it is defined as follows in Equation 1:

$$\text{Fouling factor} = \left(1 - \frac{X}{100}\right)^{\text{Membrane Age}} \qquad \text{Equation 1}$$

where X is flux decline per year. Flux decline refers to the percentage of permeate flux loss per year caused by membrane fouling.

The fouling factor is a projection of membrane fouling over time, which typically has a value between 0 to 1. The fouling factor of 1 indicates that the aged membrane has the same fouling profile as a new membrane, while smaller fouling factor means more severe fouling. For the SRU process, the major fouling mechanisms causing flux reduction include particle plugging and biofouling. In some embodiments, the fouling factor will cover all the fouling mechanisms that may result in membrane permeate flux reduction.

Figure 4:
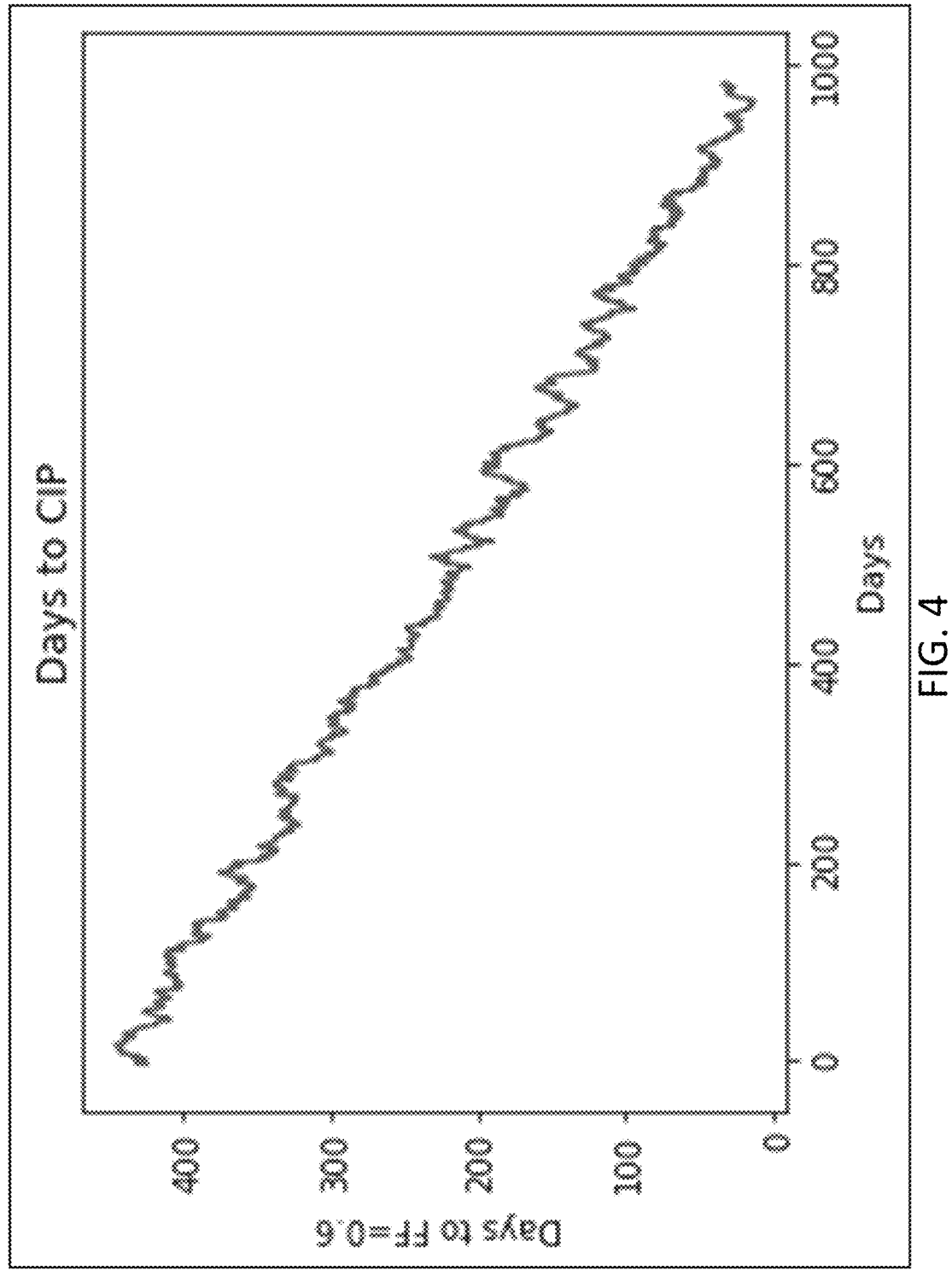
FIG. 4 illustrates one example diagram of a calculated variable for CIP frequency.

Machine Learning models have demonstrated very good performance in predicting variables that are not measurable directly like Fouling Factor. Defining a critical Fouling Factor for the operation of the SRU membranes can be used to determine the optimum frequency for Clean in Place (CIP), which strongly impact the membrane performance and life. Too frequent CIP will result in permanent chemical damage to the membranes, while lack of CIP compromises the operation of the membranes. FIG. 4 shows a calculated variable "Days to CIP" that will be predicted based on actual conditions.

Optionally, the performance indicator comprises an anomaly detection performance indicator and the performance indicator model detects an anomaly indicating that a parameter of the membrane is outside of a predetermined baseline. For example, optionally, at step 640, the method 600 may include training a separate anomaly detection model in a similar manner as described hereinabove to detects an anomaly indicating that a parameter of the membrane is outside of a predetermined baseline (e.g., the baseline used for model training). In some embodiments, Local Outlier Factor (LOF), Support Vector Machine (SVM), Isolation Forest (IF), or any combination thereof may be utilized to train the Anomaly Detection model. In some embodiment, a single Anomaly Detection model may be trained to detect anomalies. In some embodiments, an Anomaly Detection First Pass model and an Anomaly Detection Second Pass model may be trained to detect anomalies. Anomaly detection was developed to understand the deviation of membrane performance and screen out data outliers for improved decision making. Some embodiments may perform anomaly detection with Local Outlier Factor (LOF): "The Local Outlier Factor (LOF) algorithm is an unsupervised anomaly detection method which computes the local density deviation of a given data point with respect to its neighbors. It considers as outliers the samples that have a substantially lower density than their neighbors." (Fabian Pedregosa, et al. "Scikit-learn: Machine Learning in Python," *Journal of Machine Learning Research*, vol. 12, pp. 2825-2830, 2011, which is incorporated by reference). Furthermore, the method 600 may also include obtaining second synthetic data from a data store; and detecting, with the performance indicator model, an anomaly indicating that a parameter of the membrane is outside of a predetermined baseline based on the second synthetic data.

Figures 5A, 5B:
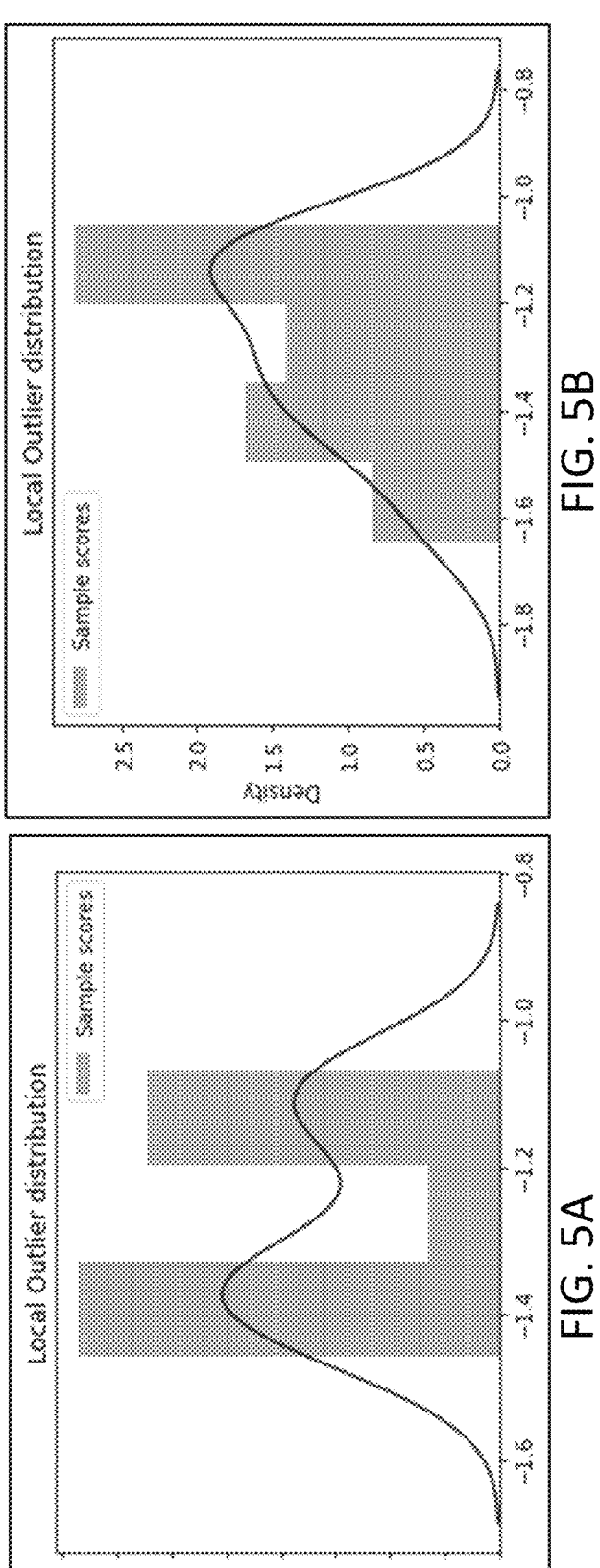
FIG. 5A illustrates one example diagram of a local outlier distribution (Normal).
FIG. 5B illustrates one example diagram of a local outlier distribution (33% anomalous points).

Anomaly detection may also be applied to membranes to identify rare events. Anomaly detection may alert the operator when membrane parameters are outside the baseline used for model training. FIG. 5A shows the local outlier distributions for a normal condition and FIG. 5B for 33% anomalous points. One can see how the sample score distribution in FIG. 5B starts to skew to the left having more points below the threshold.

Figure 14:
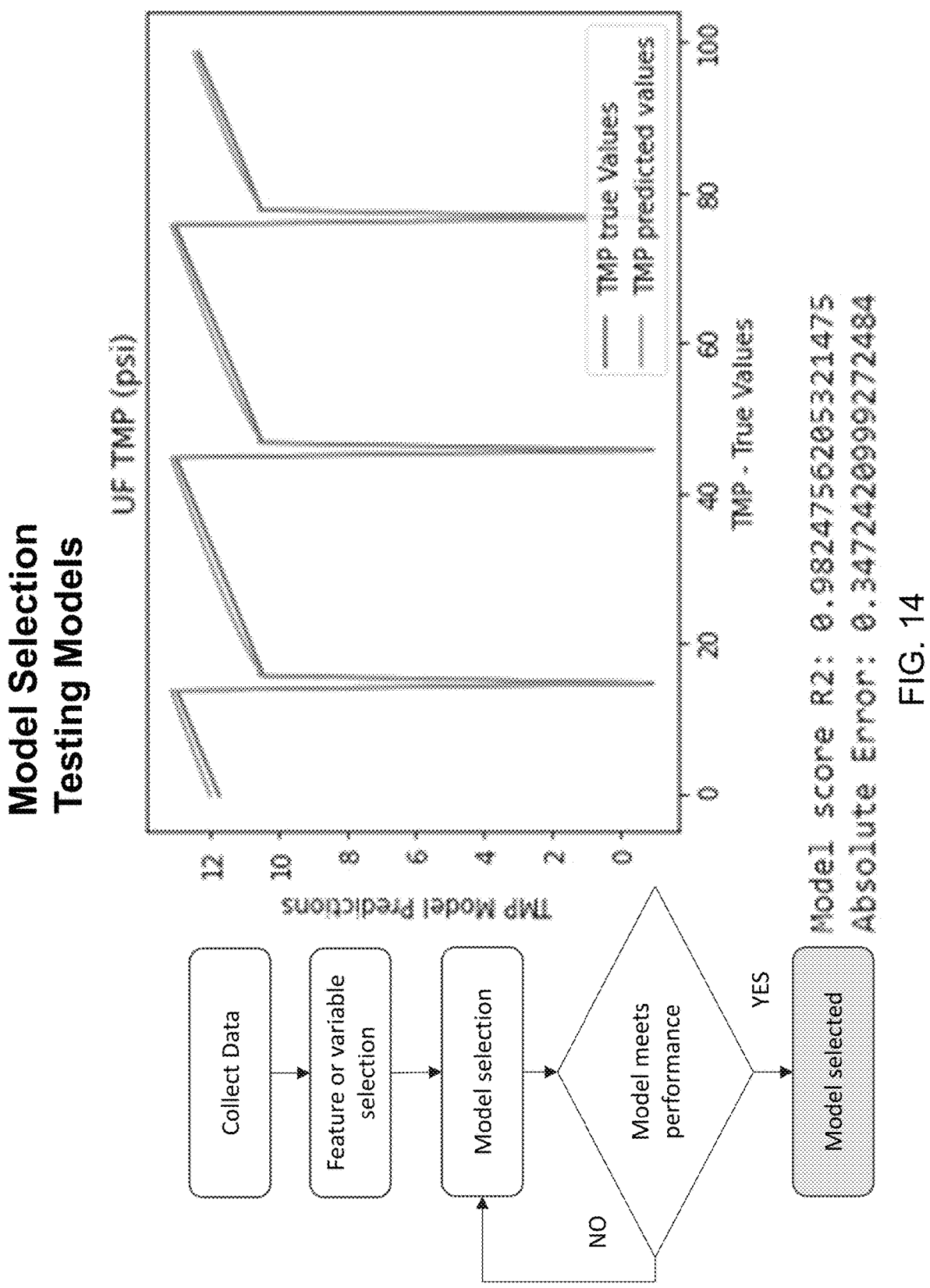
FIG. 14 illustrates an example with a UF.

The models, the sulfate content value, the fouling factor value for the membrane, the TDS content value in the permeate stream, the detected anomaly, the recommendation, or any combination thereof may be generated as described herein. And, a representation may be generated for the models, the sulfate content value, the fouling factor value for the membrane, the TDS content value in the permeate stream, the detected anomaly, the recommendation, or practically any other item previously mentioned in the method 600, and the representation may be displayed via a graphical user interface/display. Furthermore, those of ordinary skill in the art will appreciate that the order of steps illustrated in the method 600 is not exhaustive and the steps may be executed in a different order depending on the specific implementation. Those of ordinary skill in the art will also appreciate that although separate models are discussed herein, some embodiments may even train a model for multiple predictions. The membrane may also be different, and for example, may be UF as illustrated in FIG. 14.

Modeling Process and Results: Synthetic data (data from simulation) was used for this development, which provides significant advantages. First, the models may be developed before the facility start-up and second, a broader operational range on the dataset can be achieved. Data Augmentation techniques have proven to be effective to improve model performance and the ability to use more complex model's frameworks. Key model parameters have been identified using feature engineering and an instrumentation gap analysis was performed to determine if all the instrumentation needed was included as part of the process design.

FIGS. 1A and 1B illustrate the impact of applying data augmentation techniques, as there is a substantial improvement on the generalization and accuracy of the model. Additionally, data augmentation will allow more complex models to be used like Multi-Layer Perceptron (MLP).

Figure 2:
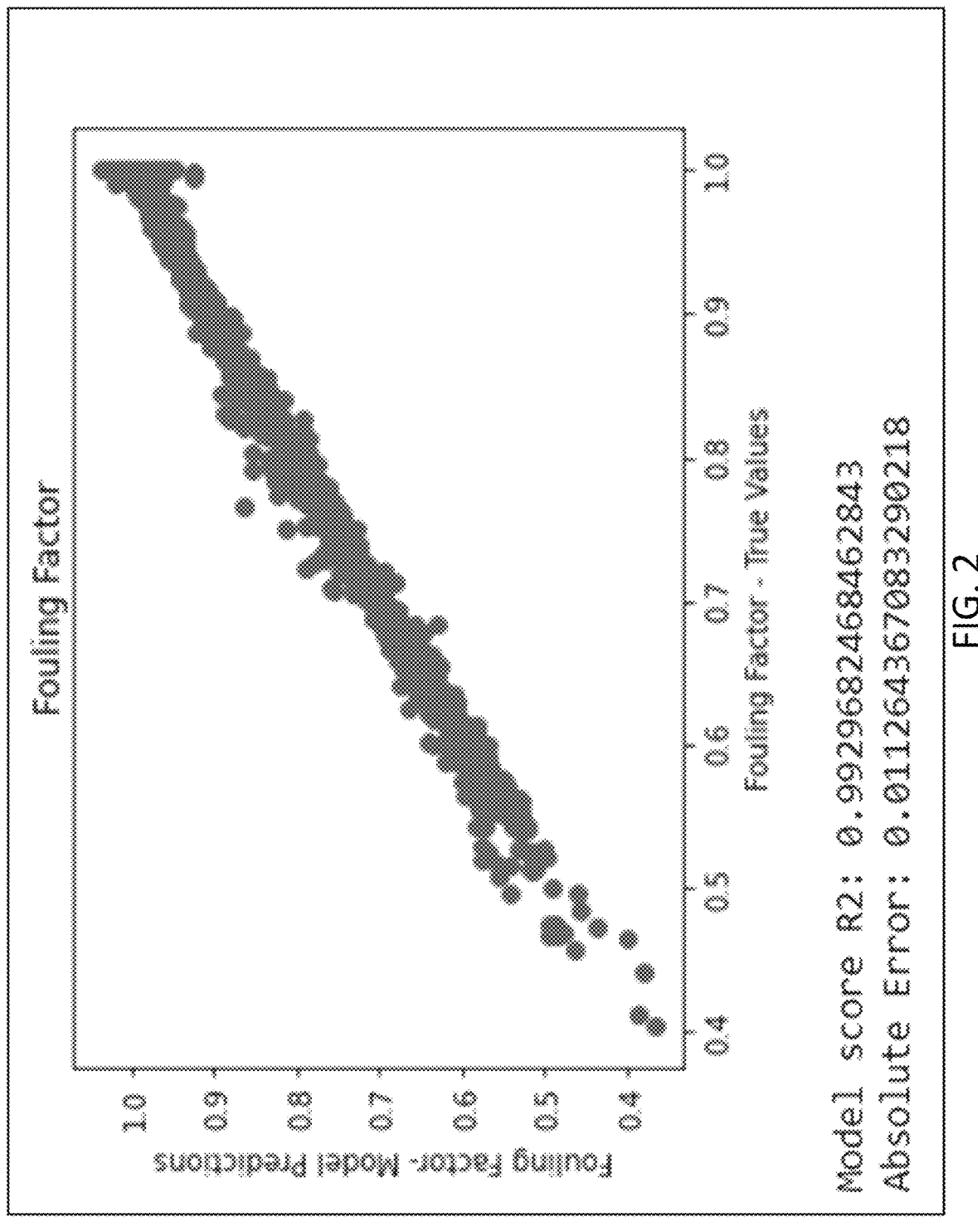
FIG. 2 illustrates one example diagram of second pass SRU Fouling Factor model performance.

Several models were tested, and extensive validation performed. FIG. 2 shows Fouling Factor Model performance for Second Pass SRU. Model performance is good, allowing a reliable prediction of the target variables.

The SRU prediction model was successfully built, which was validated through obtaining the best model score from the different models evaluated. The model was further validated using a validation dataset. The model utilized measurable process parameters (i.e., pressure, temperature, conductivity etc.) to predict the process data that is more difficult to measure and was able to predict key operating parameters as well as the membrane fouling profile.

Figure 3:
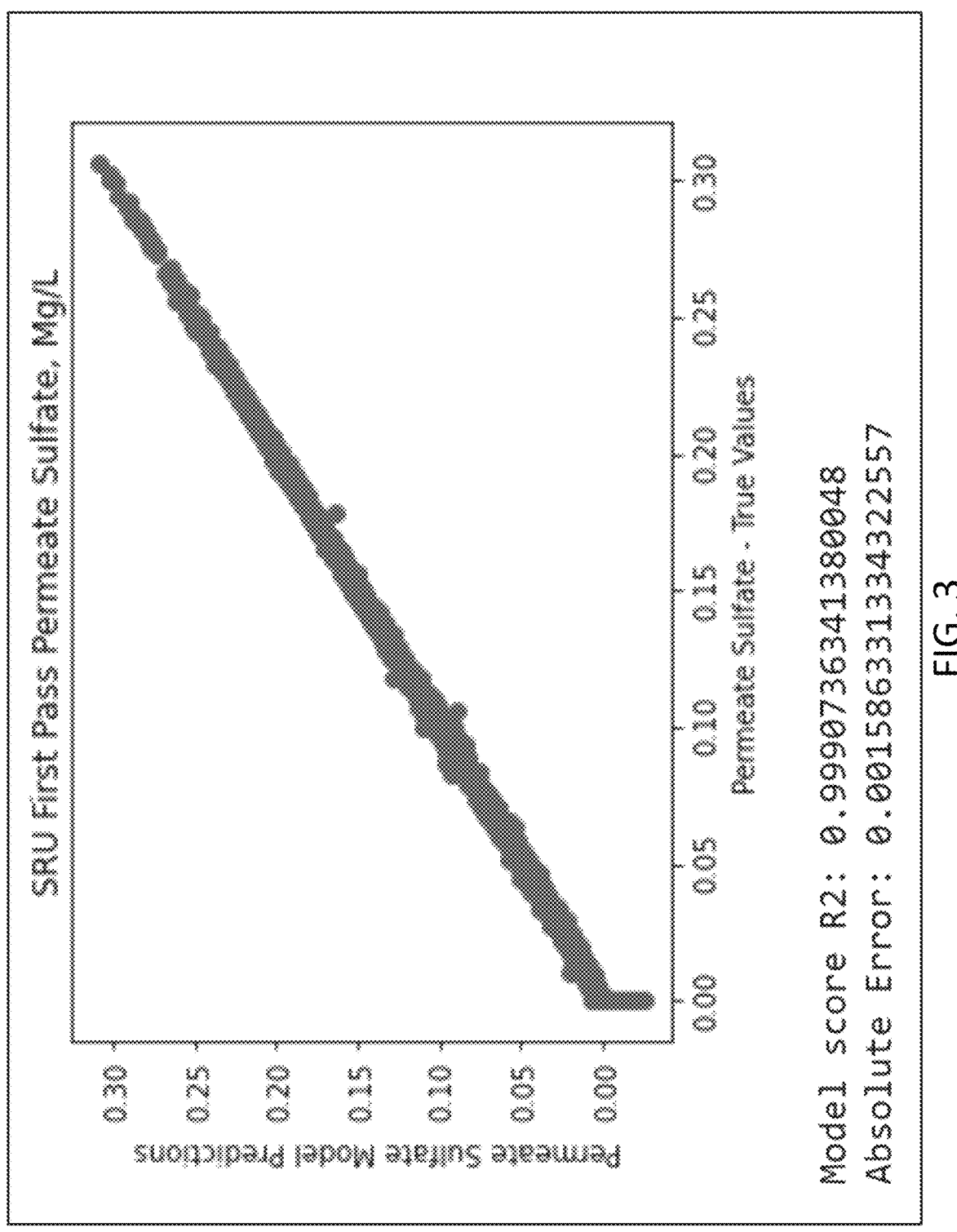
FIG. 3 illustrates one example diagram of first pass SRU sulfate content in mg/L model performance.

As will be discussed further hereinbelow in the context of the method 1500 at FIG. 15, this may provide enhanced visibility to operators on membrane performance to support decision making. For example, it can also serve as a back-up measurement for the sulfate content analyzer providing further insight to real-time data, and reducing the risk of reservoir souring. FIG. 3 illustrates the model performance for sulfate prediction on the first pass SRU. One key advantage of the predictive model is to provide a much faster measurement than the sulfate content analyzer.

Machine Learning models have demonstrated very good performance in predicting variables that cannot not be measured directly like Fouling Factor. Defining a critical Fouling Factor for the operation of the SRU membranes can be used to determine the optimum frequency for Clean in Place (CIP), which strongly impact the membrane performance and life. Too frequent CIP will result in permanent chemical damage to the membranes, while lack of CIP compromises the operation of the membranes. FIG. 4 shows a calculated variable "Days to CIP" that will be predicted based on actual conditions.

Anomaly detection is applied to SRU membranes to identify rare events. Two models were developed targeting performance and membrane integrity separately. Anomaly detection will alert the operator when membrane parameters are outside the baseline used for model training. FIG. 5A shows the local outlier distributions for a normal condition and FIG. 5B for 33% anomalous points. One can see how the sample score distribution in FIG. 5B starts to skew to the left having more points below the threshold.

Operator Training Simulator (OTS) Model Integration: Current industrial practice relies on only pressure drop and a constant cleaning interval frequency to perform Sulfate Removal Unit (SRU) maintenance, which may result in reduced membrane life due to frequency cleaning or severe membrane fouling without the capability to predict fouling based on process conditions. Indeed, modelled in OTS (Operator Training Simulator) for Ultrafiltration (UF) and Sulfate Removal Unit (SRU) design includes a basic pressure differential across membrane and has no ability to simulate actual membrane performance (e.g., sulfate content) and fouling. It is a standard industrial practice to only utilize differential pressure in modeling, however, it overlooks many factors that influence membrane performance.

Advantageously, the machine learning techniques applied herein will fill the gap and deliver a prediction model based on synthetic data for input into the Operator Training Simulator (OTS). This model may also track and monitor the system key performance indicators (KPIs), provide estimates on when the next maintenance procedure is required, and optimize membrane performance by tuning operation conditions. The machine learning analytics provided herein may include the following factors: feed water composition, temperature, conductivity, flux distribution and fouling. These factors may be utilized in optimizing UF and SRU operations, maintenance, minimizing operating costs, and extending the membrane lifetime. Thus, in the OTS context, the machine learning based models may lead to: a model for the OTS that may be more accurate, a model for the OTS that may respond to membrane parameters not just a differential pressure element, and/or KPIs that may be tested ahead of time (e.g., before the fluid treatment system starts up). Indeed, the OTS provides the additional advantage that the monitoring KPIs can be tested ahead of time when production data is not available.

Advantageously, embodiments consistent with the instant disclosure may increase accuracy and ability to develop scenarios for the OTS (Operator Training Simulator) as the current models are very basic. As an example, there are no off the shelf models for membrane processes that can be used on the Operator Training Simulation (OTS).

Advantageously, implementation of these models will allow the operator to be familiar with membrane parameters, increase membrane model accuracy, and have a better idea of membrane behavior, helping training and engineering development.

Of note, those of ordinary skill in the art will appreciate that the discussion in the membrane monitoring section may be applicable to the OTS model integration section and vice versa. Therefore, repetition will be avoided for simplicity, but the membrane monitoring section may be applicable to the OTS model integration section and vice versa.

Turning now to FIG. 15, at step 1505, the method 1500 includes obtaining synthetic data for a fluid treatment system from a data store. Synthetic data may include engineering cases as well as data generated through data augmentation techniques. Synthetic data is discussed hereinabove in the membrane monitoring section. The fluid treatment system comprises a membrane and the fluid treatment system is configured to receive a stream of fluid for treatment. In some embodiments, the fluid treatment system comprises a plurality of ultrafiltration membranes, a plurality of sulfate removal membranes, or any combination thereof. In some embodiments, the stream of fluid for treatment comprises hydrocarbon, sea water, brackish water, flowback water, produced fluid, reclaimed or recycled water, brine (e.g., reservoir or synthetic brine), fresh water (e.g., fresh water comprises <1,000 ppm TDS water), slickwater, or any combination thereof. In some embodiments, the stream of fluid for treatment has a temperature of less than or equal to 45 C. In some embodiments, the stream of fluid for treatment has sulfate of >20 mg/L. The general industry sulfate target for offshore SRU is usually 20 mg/L or even 40 mg/L; however, some facilities may require <10 mg/L of sulfate, which makes water quality monitoring more critical and challenging. Thus, in some embodiments, the fluid treatment system may have a effluent sulfate target ≤10 ppm. In some embodiments, the treatment of the stream of fluid has not commenced in the fluid treatment system at step 605.

At step 1510, the method 1500 includes training a machine learning pressure prediction model using the synthetic data to predict a pressure for the membrane of the fluid treatment system. In some embodiments, training the machine learning pressure prediction model using the synthetic data to predict the pressure for the membrane of the fluid treatment system includes training to predict feed pressure of the membrane. In some embodiments, training the machine learning pressure prediction model using the synthetic data to predict the pressure for the membrane of the fluid treatment system includes training to predict reject pressure of the membrane. In some embodiments, training the machine learning pressure prediction model using the synthetic data to predict the pressure for the membrane of the fluid treatment system includes training to predict a plurality of reject pressures of the membrane. Thus, some embodiments may train to predict feed pressure of the membrane, reject pressure of the membrane, a plurality of reject pressures of the membrane, or any combination thereof. The trained pressure prediction model is combinable with an operator training simulator (OTS) model to update the OTS model to improve accuracy of simulation pressure data from the OTS model.

In some embodiment, a single Feed Pressure, Reject Pressure Stage 1, Reject Pressure Stage 2 model may be trained for the prediction. In some embodiments, a Feed Pressure, Reject Pressure Stage 1, Reject Pressure Stage 2—First Pass model and a Feed Pressure, Reject Pressure Stage 1, Reject Pressure Stage 2—second Pass model may be trained for the prediction. In some embodiments, Multi-Layer Perceptron (MLP) may be utilized to train the Feed Pressure, Reject Pressure Stage 1, Reject Pressure Stage 2 model. In some embodiments, Linear Bayesian Ridge may be utilized to train the Feed Pressure, Reject Pressure Stage 1, Reject Pressure Stage 2 model.

Figure 16A:
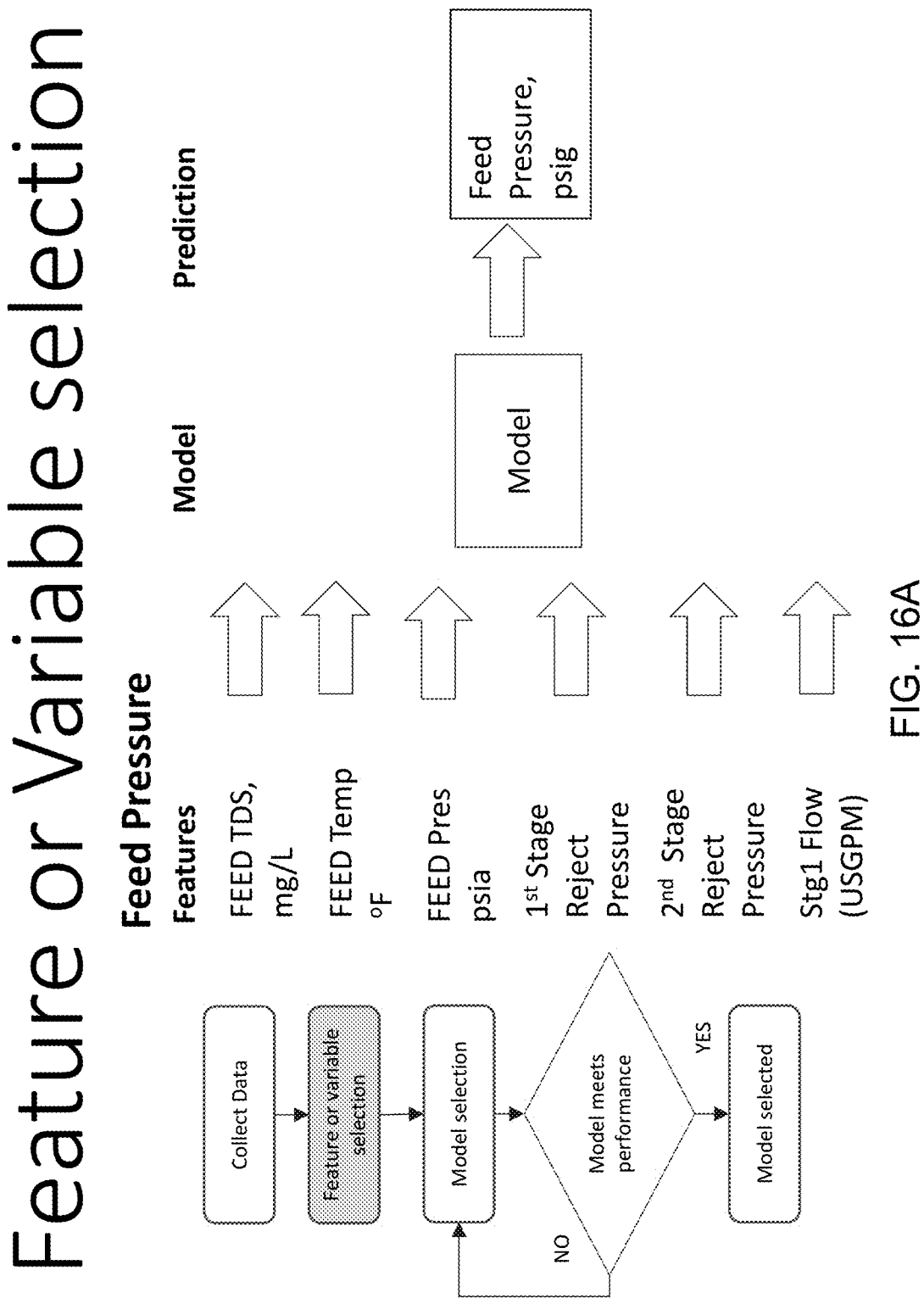
FIGS. 16A, 16B, and 16C illustrate examples of a method of feature or variable selection.
Figure 16B:
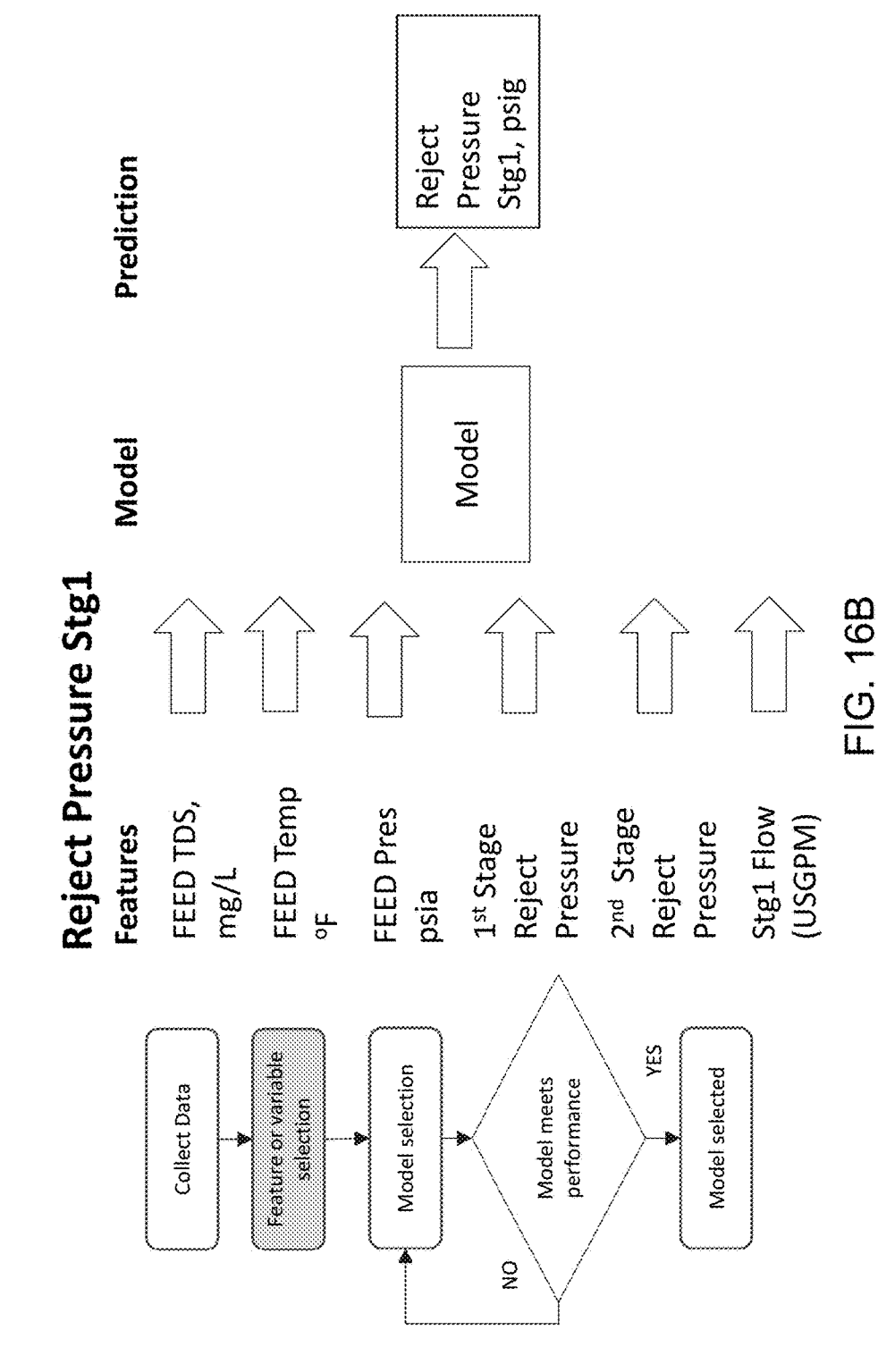
Figure 16C:
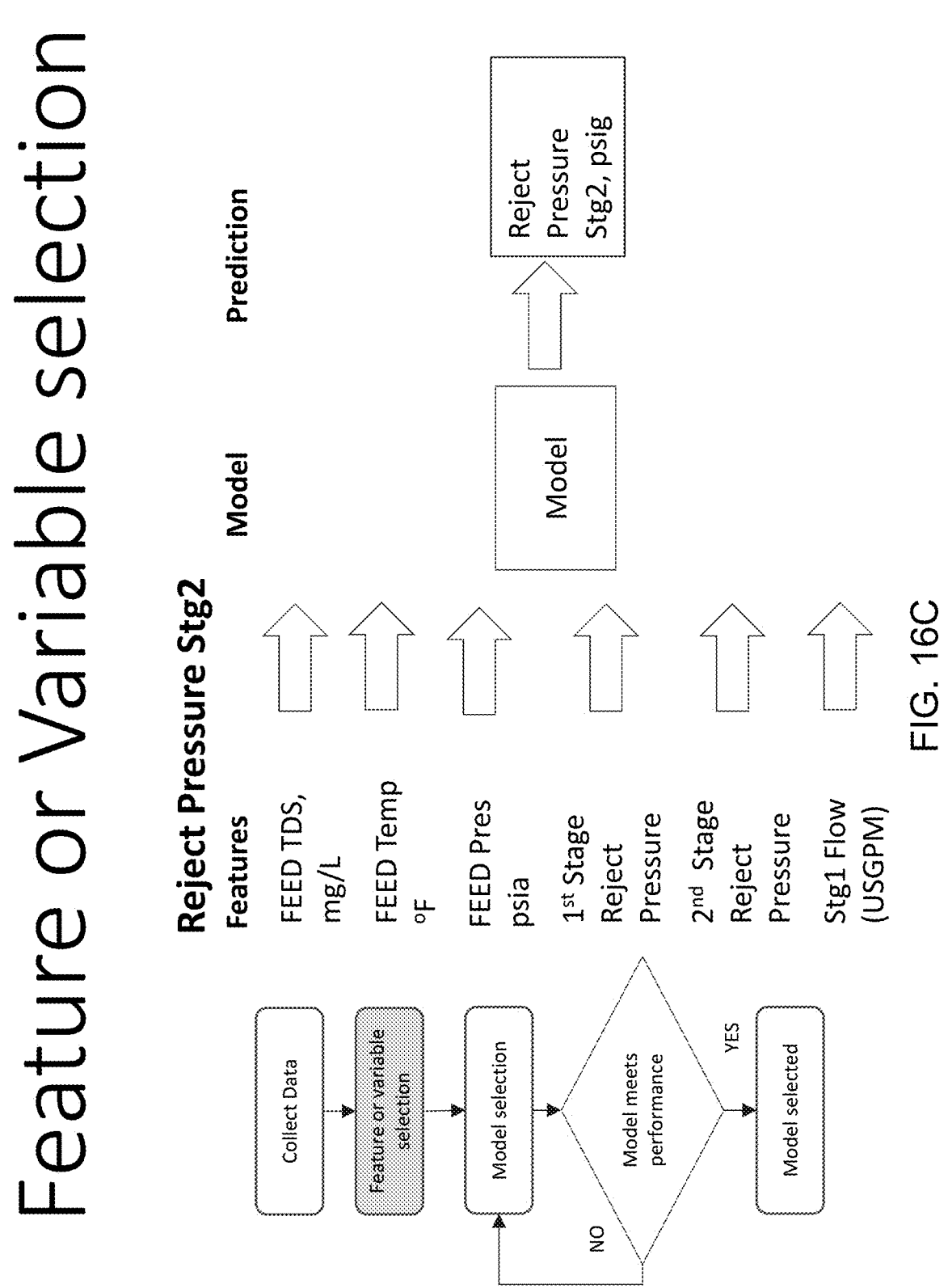

FIGS. 16A, 16B, and 16C illustrate examples of a method of feature or variable selection. The collecting data step refers to FIG. 15, step 1505. As explained hereinabove, the synthetic data may be utilized because operations have not commenced at the facility. As illustrated in FIGS. 16A, 16B, and 16C, feature or variable selection for feed pressure, reject pressure stg1, and reject pressure stg2, respectively, may include (a) features such as FEED TDS (mg/L), FEED Temp ($^\circ$ F.), FEED Pres (psia), $1^{st}$ Stage Reject Pressure, $2^{nd}$ Stage Reject Pressure, and Stg1 Flow (USGPM). In some embodiments, each model may comprise a corresponding score. The model may be selected based on the corresponding score. One or more machine learning techniques may be utilized for the training, such as, but not limited to, linear regression, ridge regression, ridge regression with built in cross validation, decision tree regressor, and/or bagging (bootstrap aggregation) techniques.

Figure 17:
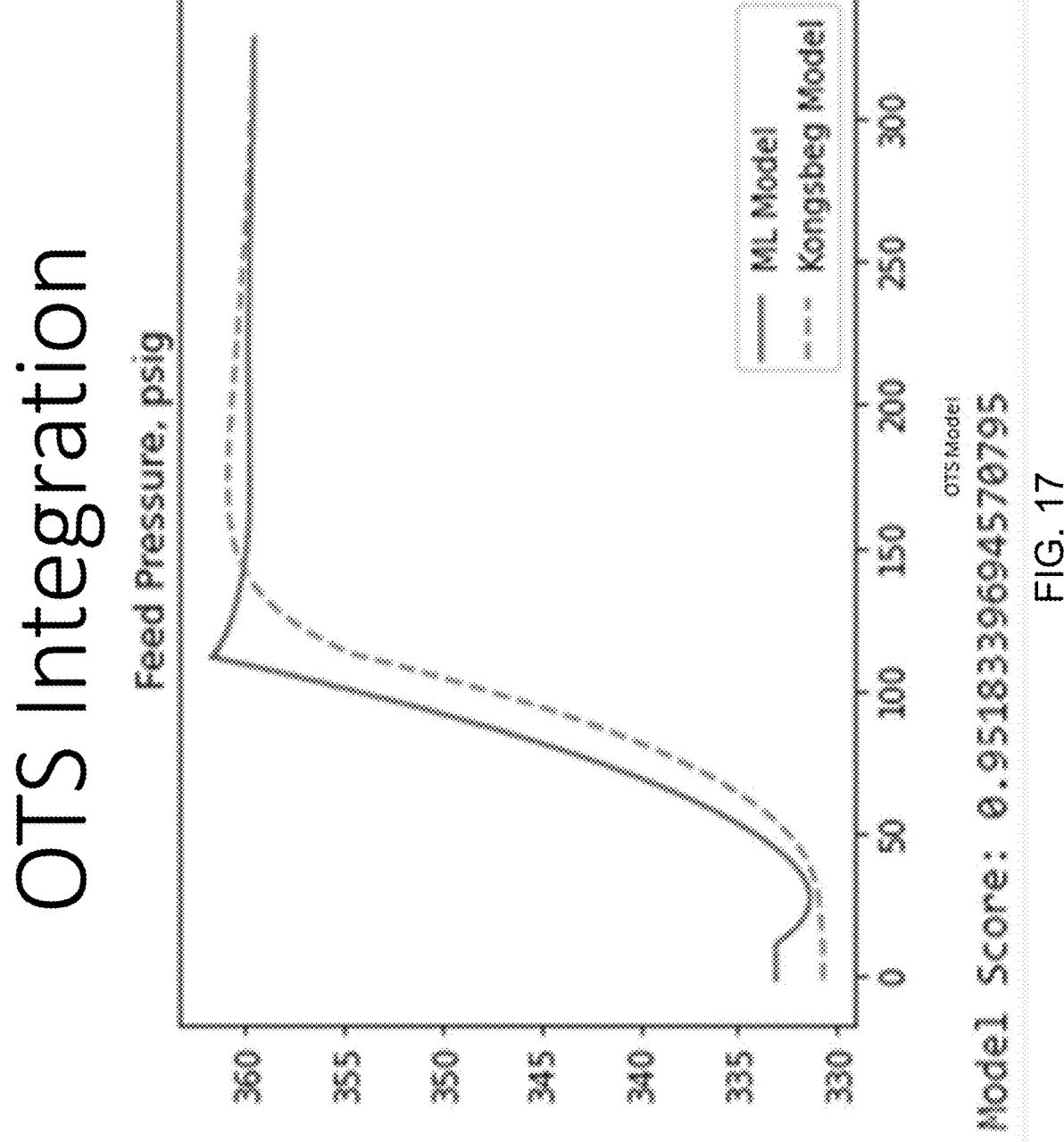
FIG. 17 illustrates one example of combining the trained pressure prediction model with the target OTS model to update the target OTS model to form an updated target OTS model.

After the Feed Pressure, Reject Pressure Stage 1, Reject Pressure Stage 2 model is selected at step 1510, those of ordinary skill in the art will appreciate that various options are available. For example, optionally, at step 1515, the method 1500 includes obtaining a target OTS model from a data store; and combining the trained pressure prediction model with the target OTS model to update the target OTS model to form an updated target OTS model. Combining includes providing the pressure prediction for the membrane to the target OTS model to form the updated target OTS model. For example, the trained pressure prediction model using synthetic data for predicting membrane feed pressure may be built and used to update pressure data in an OTS model. The feed pressure model for OTS simulation: this prediction may be used to improve the OTS model's accuracy, including control system validation and operational procedures testing. In some embodiments, this integration may include transforming the model into a spreadsheet and developing a script based on the spreadsheet file in OTS. FIG. 17 illustrates one example of combining the trained pressure prediction model with the target OTS model to update the target OTS model to form an updated target OTS model (e.g., integration with the OTS model). In FIG. 17, the Feed pressure model was integrated into the OTS model and provides the response on SRU Feed Pressure with a model score or R2 of 0.95 (1 is perfect match). The graph represents the impact on FEED pressure due to changes in Fouling Factor from 1 to 0.6 and membrane aging from 0 to 2 years.

Figure 18:
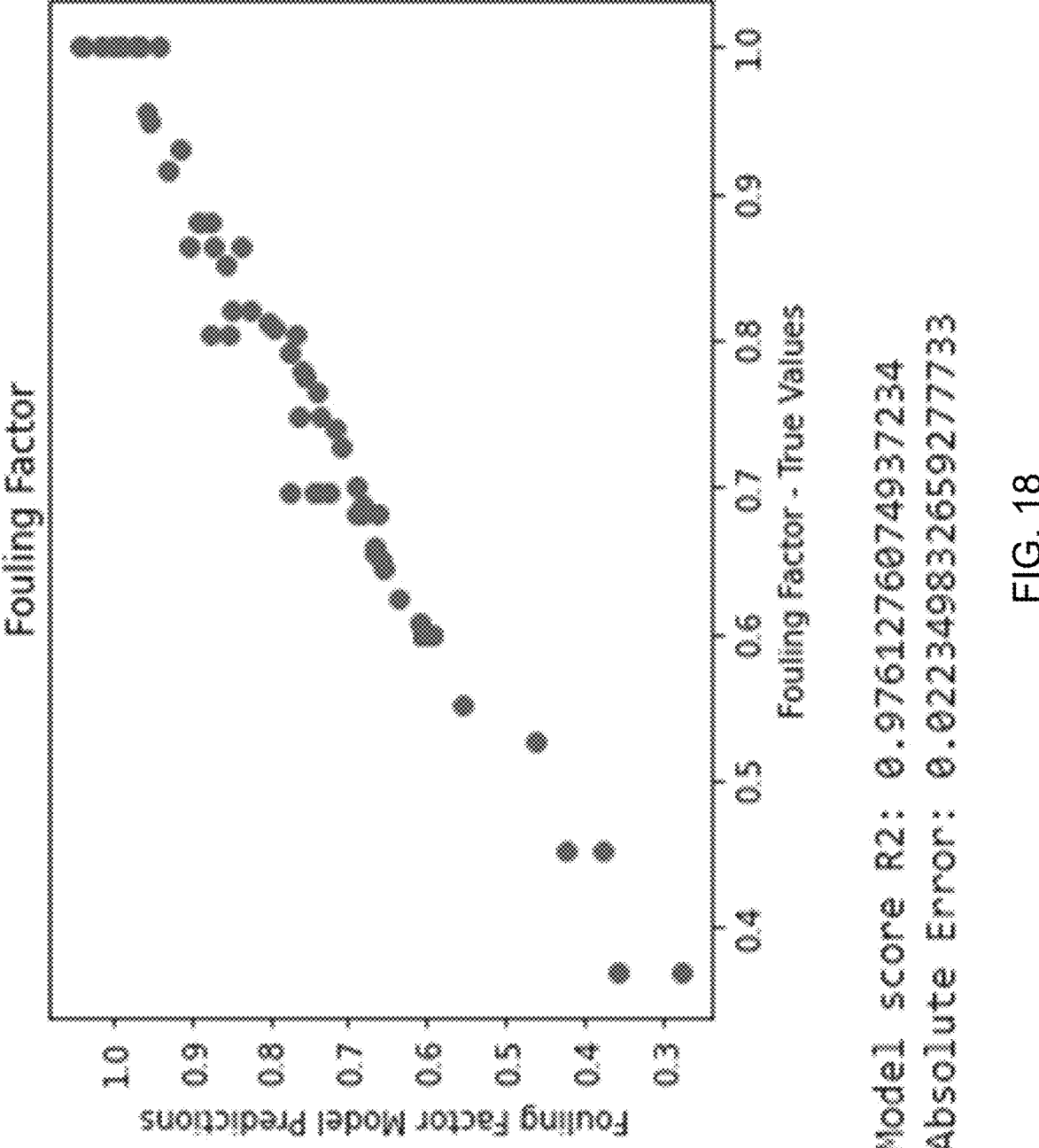
FIG. 18 illustrates one example of retraining the trained pressure prediction model using the hybrid data to form a retrained pressure prediction model.
Figure 19:
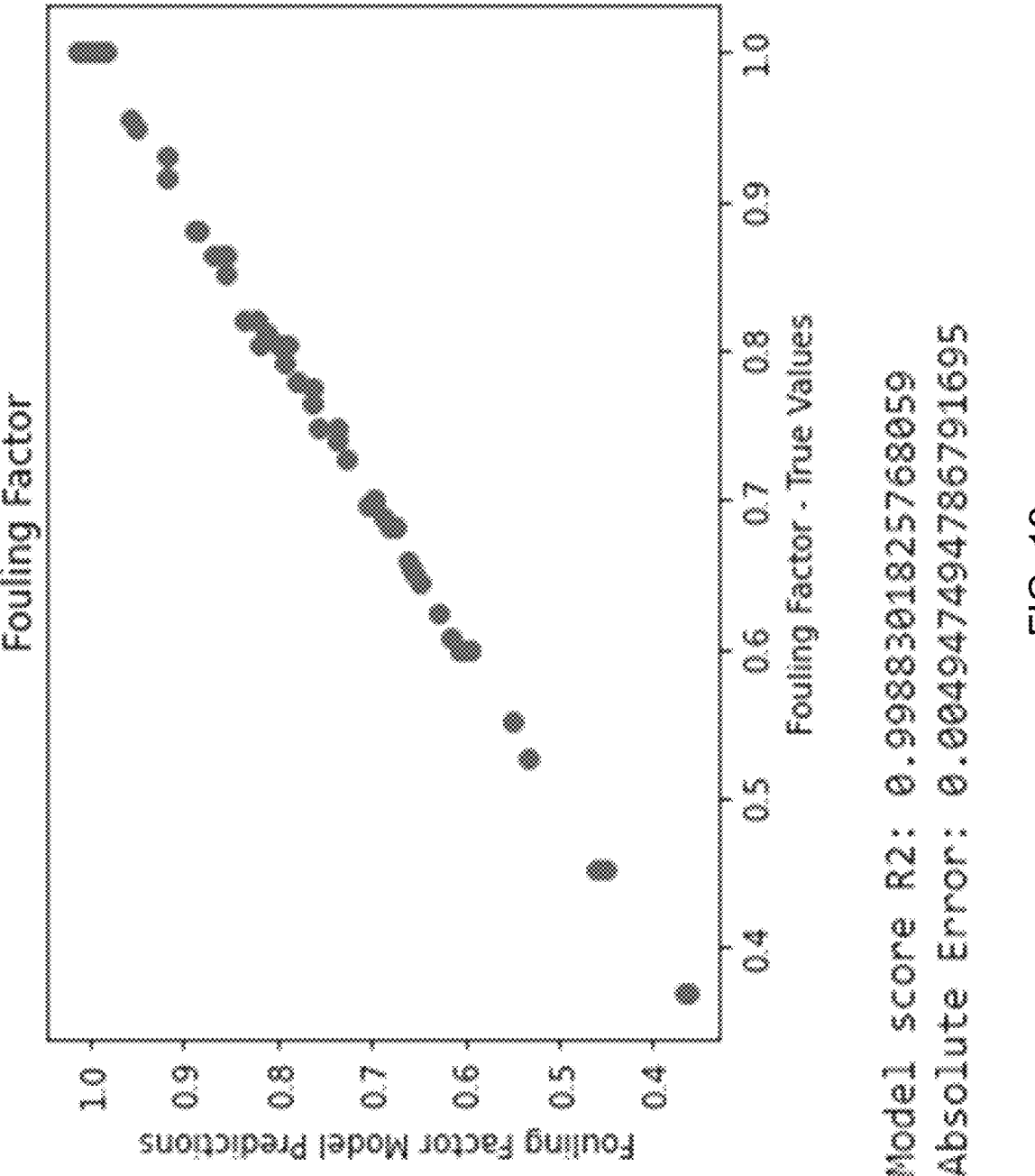
FIG. 19 illustrates another example of retraining the trained pressure prediction model using the hybrid data to form a retrained pressure prediction model.

After operation commences at the fluid treatment system, at step 1520, the method 1500 includes obtaining process data for the fluid treatment system after operation commences at the fluid treatment system from a data store; combining the process data with the synthetic data to generate hybrid data; and retraining the trained pressure prediction model using the hybrid data to form a retrained pressure prediction model. For example, a hybrid dataset may have data for off-design cases and field data for model accuracy. FIG. 18 illustrates one example of retraining the trained pressure prediction model using the hybrid data to form a retrained pressure prediction model. In FIG. 18, the model trained with a hybrid dataset still performs very well. FIG. 19 illustrates another example of retraining the trained pressure prediction model using the hybrid data to form a retrained pressure prediction model. In FIG. 19, additional membrane features were added to improve the model's accuracy.

Other optional steps may also be performed after operation commences at the fluid treatment system. Optionally, at step 1525, the method 1500 includes obtaining a second target OTS model; and combining the retrained pressure prediction model with the second target OTS model to update the second target OTS model to form an updated second target OTS model. Combining includes providing the retrained pressure prediction for the membrane to the second target OTS model to form the updated second target OTS model.

Data obtained on the OTS runs can be used to re-train the model and support development of the procedure to create a hybrid database. In some embodiments, this may be the same procedure utilized for retraining with real data on-site during start-up and normal operations. Indeed, those of ordinary skill in the art will appreciate that updating the pressure prediction model, updating the OTS model, or both may occur a plurality of times depending on the specific implementation (e.g., steps 1515, 1520, and/or 1525) and the order illustrated in FIG. 15 is not limiting.

Figure 20A:
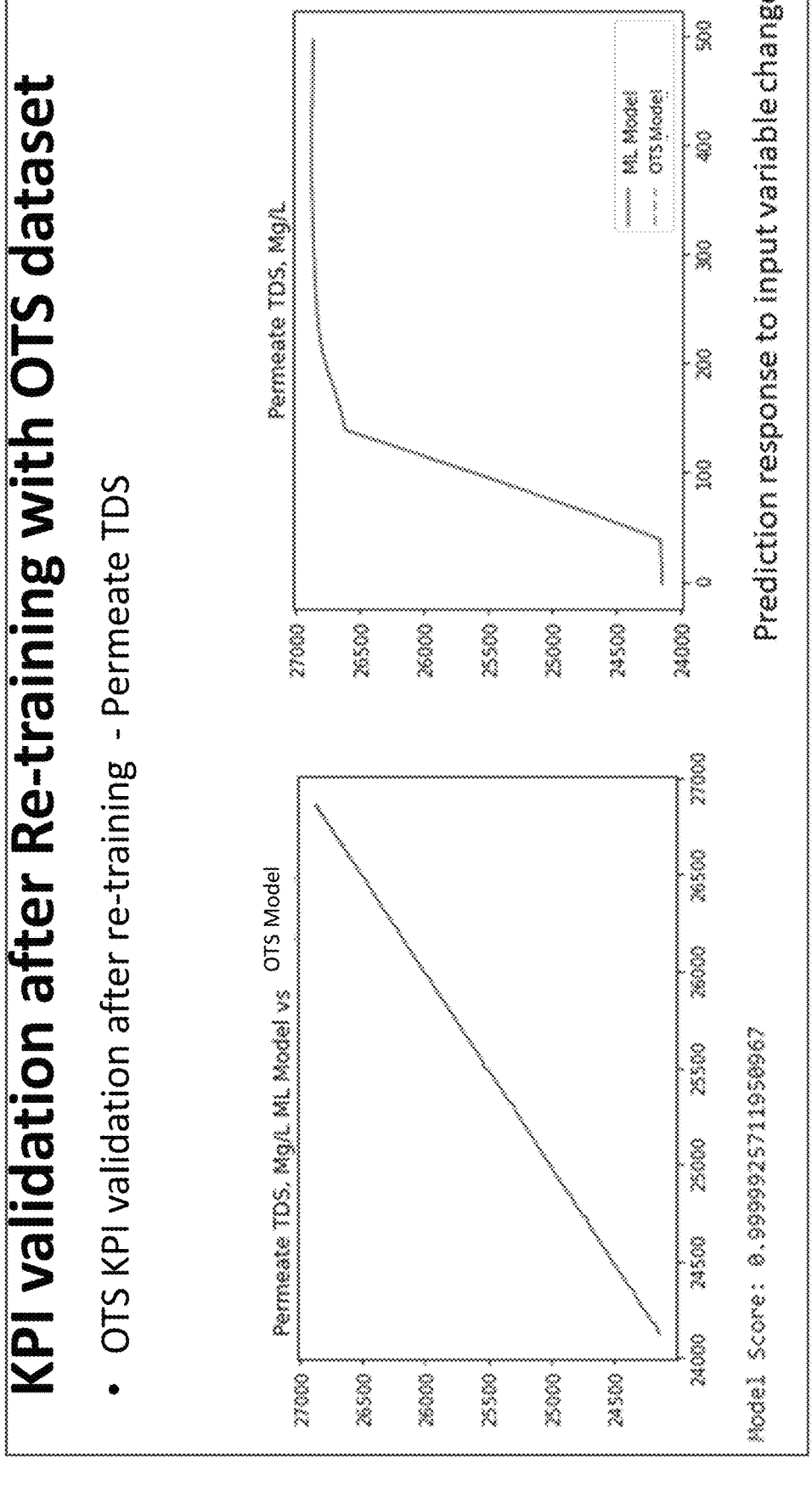
FIGS. 20A, 20B, and 20C illustrate examples of KPI validation after re-training with an OTS dataset.
Figure 20B:
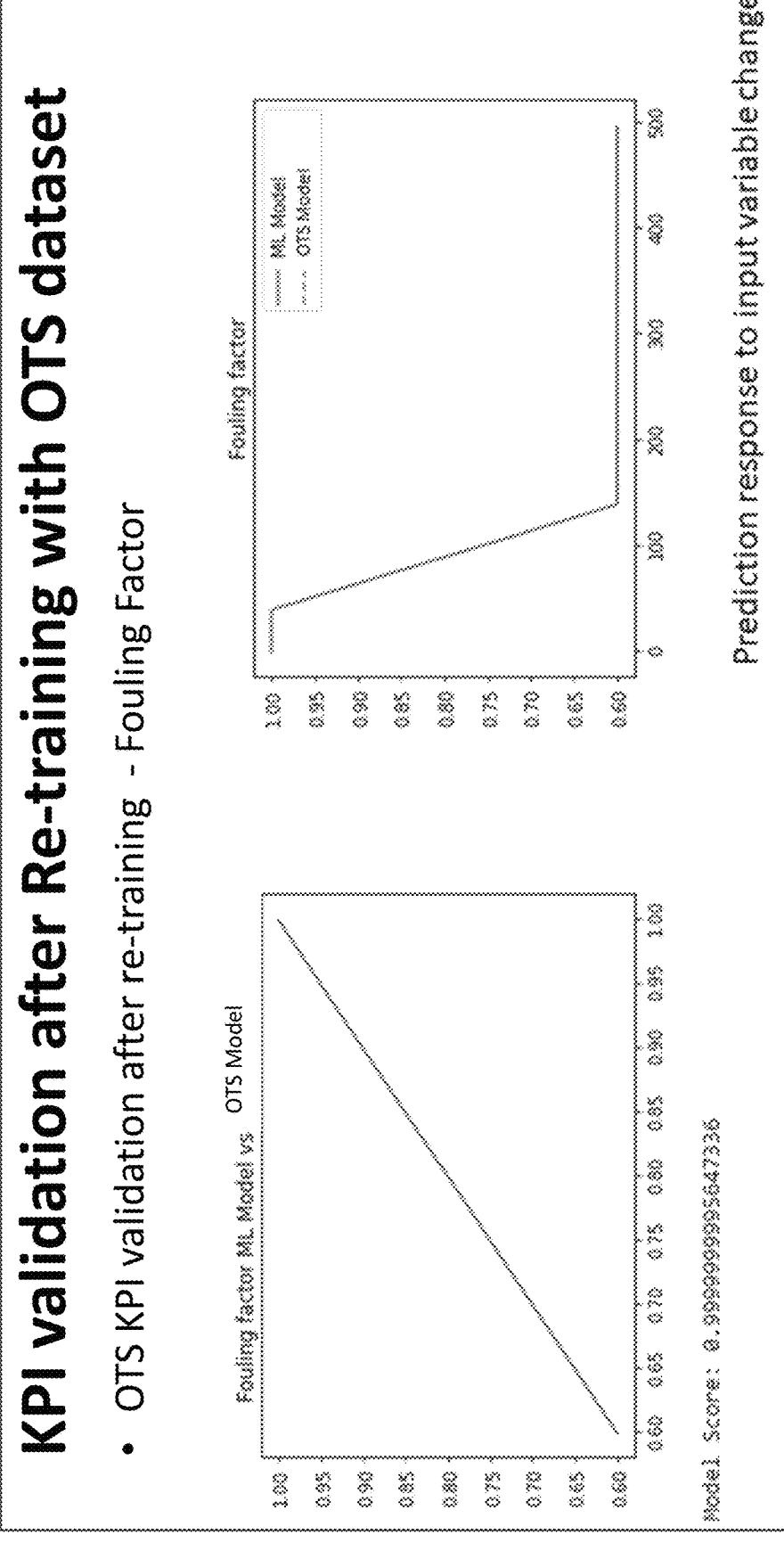
Figure 20C:
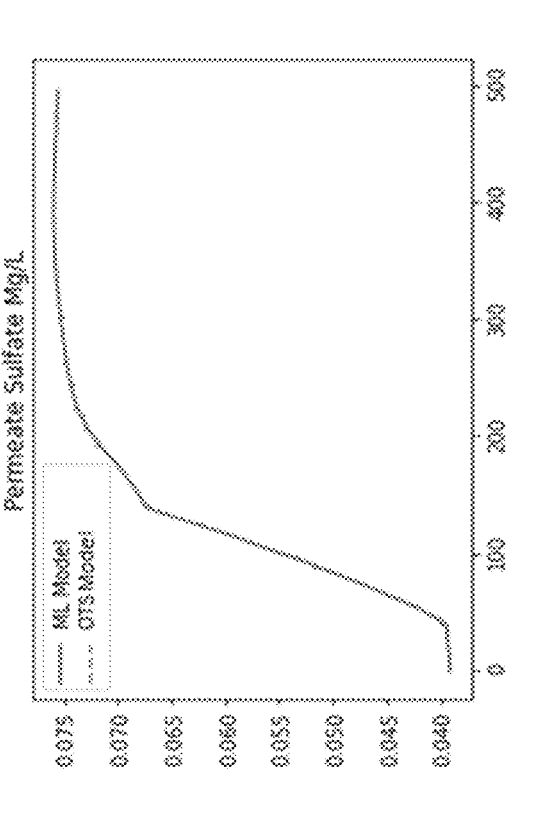

Another option in the method 1500 may be to produce pressure data from an OTS model integrated with a pressure prediction model as well as use the pressure data to build a machine learning model for each KPI that follows (e.g., see steps 1530, 1535, 1540, 1545, 1550, 1555, and/or 1560 and see the membrane monitoring section herein): (a) Fouling Factor: This is an indicator for membrane performance and it may allow the operator to have an idea of the membrane's current conditions helping the operator to make operational decisions. (b) Permeate TDS: This is another performance indicator. (c) Permeate Sulfate: Estimated based on process conditions and may be used to validate an on-line sulfate content analyzer. (d) Anomaly detection. Thus, optionally, at step 1530, the method 1500 includes running simulations using the updated target OTS model to generate target simulation pressure data with the updated target OTS model. Optionally, at step 1535, the method 1500 includes training a performance indicator model using the target simulation pressure data to predict a performance indicator for the fluid treatment system. In some embodiments, the performance indicator comprises a fouling factor performance indicator and the performance indicator model predicts a fouling factor value for the membrane. In some embodiments, the performance indicator comprises a permeate total dissolved solids (TDS) performance indicator and the performance indicator model predicts a TDS content value in a permeate stream. In some embodiments, the performance indicator comprises a permeate sulfate performance indicator and the performance indicator model predicts a sulfate content value in a permeate stream. In some embodiments, the performance indicator comprises an anomaly detection performance indicator and the performance indicator model detects an anomaly indicating that a parameter of the membrane is outside of a predetermined baseline. Thus, in some embodiments, the performance indicator comprises a fouling factor performance indicator and the performance indicator model predicts a fouling factor value for the membrane (step 1550); the performance indicator comprises a permeate total dissolved solids (TDS) performance indicator and the performance indicator model predicts a TDS content value in a permeate stream (step 1545); the performance indicator comprises a permeate sulfate performance indicator and the performance indicator model predicts a sulfate content value in a permeate stream (step 1540); the performance indicator comprises an anomaly detection performance indicator and the performance indicator model detects an anomaly indicating that a parameter of the membrane is outside of a predetermined baseline (step 1555); or any combination thereof. Optionally, at step 1560, the method 1500 includes combining the trained performance indicator model with the updated target OTS model to add the performance indicator to the updated target OTS model. Combining includes providing the performance indicator to the updated target OTS model. FIGS. 20A, 20B, and 20C illustrate examples of KPI validation after re-training with an OTS dataset. By doing so, machine learning models can be implemented as part of the OTS scenarios. This approach may also allow improvement of model accuracy and enables visibility of membrane parameters through design life during OTS simulations enabling deeper understanding of the system and when intervention is required.

Those of ordinary skill in the art will appreciate that various modifications may be made to the method 1500. For example, an alternative to step 1530 may be: obtaining target simulation pressure data from a data store; and training a performance indicator model using the target simulation pressure data to predict a performance indicator for the fluid treatment system. The target simulation pressure data is generated from running simulations using a target OTS model that is updated with the trained machine learning model.

The models, the feed pressure of the membrane, the reject pressure of the membrane, the plurality of reject pressures of the membrane, the sulfate content value, the fouling factor value for the membrane, the TDS content value in the permeate stream, the detected anomaly, or any combination thereof may be generated as described herein. And, a representation may be generated for the models, the feed pressure of the membrane, the reject pressure of the membrane, the plurality of reject pressures of the membrane, the sulfate content value, the fouling factor value for the membrane, the TDS content value in the permeate stream, the detected anomaly, or practically any other item previously mentioned in the method 1500, and the representation may be displayed via a graphical user interface/display. Furthermore, those of ordinary skill in the art will appreciate that the order of steps illustrated in the method 1500 is not exhaustive and the steps may be executed in a different order depending on the specific implementation. Those of ordinary skill in the art will also appreciate that although separate models are discussed herein, some embodiments may even train a model for multiple predictions.

Figures 21A, 21B, 21C:
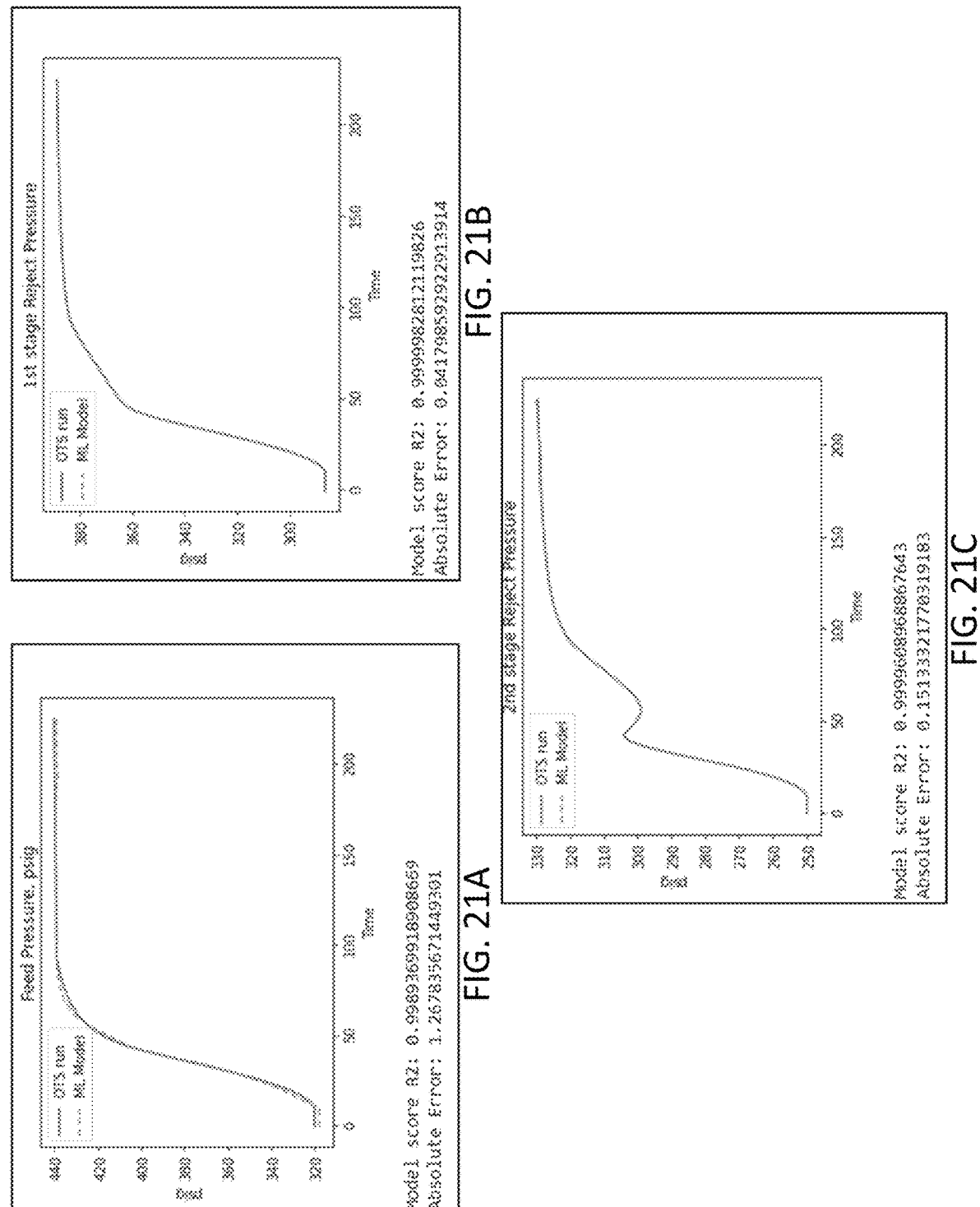
FIG. 21A illustrates one example diagram of a feed pressure.
FIG. 21B illustrates one example diagram of a reject pressure stage1.
FIG. 21C illustrates one example diagram of a reject pressure stage2.
Figure 22B:
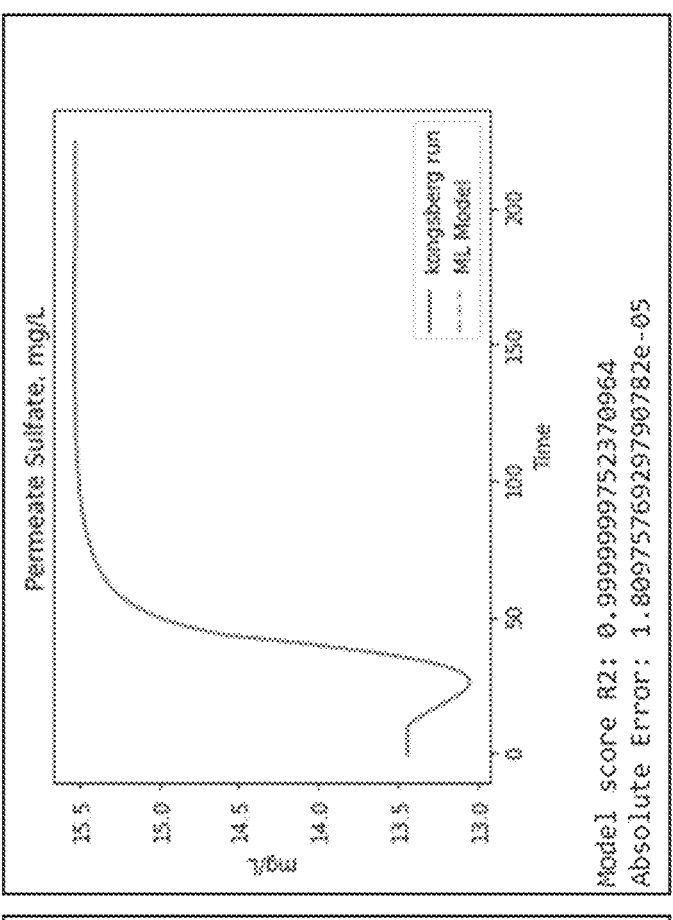
FIG. 22B illustrates one example diagram of a Permeate sulfate predicting model.
Figure 22A:
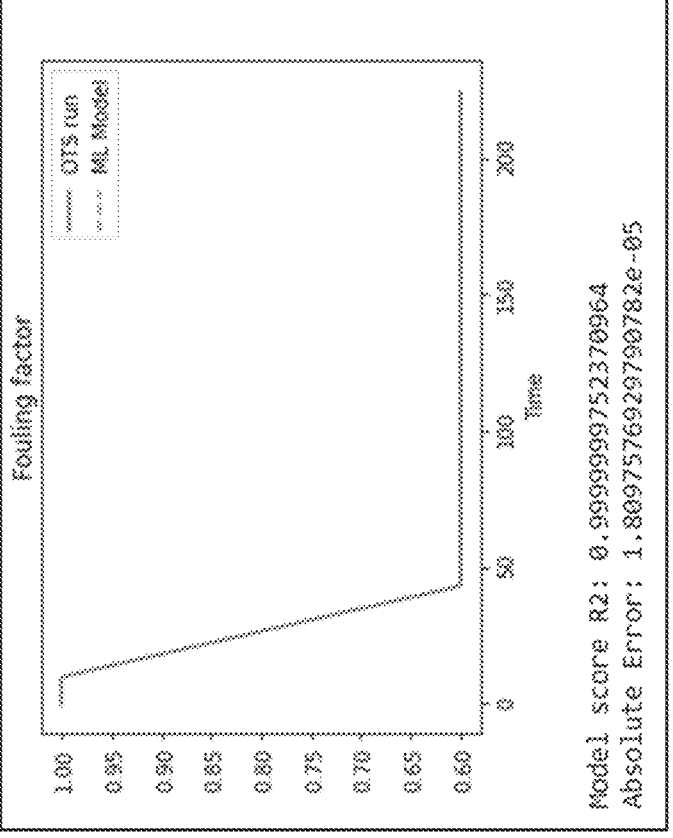
FIG. 22A illustrates one example diagram of a Fouling Factor KPI.

OTS Model Development: Machine learning models for SRU membranes can predict KPIs, that will enable the operator to create significant cost savings by optimizing membrane performance and extending membrane lifetime. Proper training based on membrane parameters will help the operator to make the right decisions in the field. These models were successfully integrated into the OTS on FIGS. 21A, 21B and 21C. One can see the OTS model pressures responding to a Fouling Factor ramped down from 1 to 0.6. Furthermore, using the OTS and re-training the models, one can observe how the Fouling Factor and Permeate Sulfate Predictive models, track very well with the real values in FIGS. 22A and 22B.

Example: One embodiment includes a fluid treatment system comprising at least one membrane (e.g., at least one ultrafiltration (UF) and at least one sulfate removal unit (SRU) to treat fluid (e.g., seawater) for a hydrocarbon recovery process (e.g., waterflood operations). The Stage 4 waterflood project design includes a seawater Sulfate Removal Unit (SRU) with target of 10 ppm sulfate. Current industrial practice relies on only pressure drop and a constant cleaning interval frequency to perform SRU maintenance which may result in reduced membrane life due to frequency cleaning or severe membrane fouling without the capability to predict fouling based on process conditions. The machine learning techniques applied will fill the gap and deliver a prediction model based on both simulation and real-time field data. This model will track and monitor the system key performance indicators (KPIs), provide estimates on when the next maintenance procedure is required, and optimize membrane performance by tuning operation conditions.

Example—Methods, Procedures, Process: Several key model input and output parameters were identified. The first step was to obtain SRU data for the prediction model. Since SRU hasn't been installed, membrane simulation tool was applied to generate hundreds of membrane performance data under various operating conditions. The next step was to use simulation data for model selection, training and validation. Several models were evaluated using training data and the model scores were compared to select the best model. Once the model is chosen and built, a separate data set other than training data was used to validate the model. Once the SRU is online and producing real-time data, the real data will be used to make adjustments to model parameters.

Example—Results, Observations, Conclusions: The SRU prediction model was built which was validated through obtaining an excellent model score. The model was further validated using validation data set. The model utilized measurable process parameters (i.e. pressure, temperature, conductivity etc.) to predict the process data that is more difficult to measure, and was able to predict key operating parameters as well as the membrane fouling profile. This tool provides enhanced visibility to Operators on membrane performance to support decision making when intervention is required. It can also serve as back-up measurement for sulfate analyzer providing further insight to real-time data from serial one sulfate analyzers—supporting additional data to reducing the risk of reservoir souring.

OTS Example—Additional Information: In this example, a machine learning model was built for offshore SRU to predict KPIs. It will enable operators to create significant cost savings by optimizing membrane performance and extending membrane lifetime. This robust model will be implemented within the OTS (Operator Training Simulator) prior to system installation.

Those of ordinary skill will appreciate that various modifications may be made to the embodiments and examples provided herein. Furthermore, any list provided herein is not exhaustive. In one embodiment, the OTS model may be controlled by a third party OTS software vendor and/or associated with a third party OTS software application, while a different party trains the pressure prediction model, trains the performance indicator model, etc. In this embodiment, there may be interaction between the two parties and/or two software applications, and the third party OTS software application/vendor may: (a) combine the pressure prediction model with their OTS model to update the OTS model, (b) update the OTS model, (c) run simulations using the updated OTS model, and/or perform other operations related to the OTS model and/or the OTS software application. In another embodiment, a single party may perform substantially all of the operations using at least one software application, including training the pressure prediction model, combining the pressure prediction model with the OTS model, updating the OTS model, running simulations using the updated OTS model, training the performance indicator model, etc.

The methods and systems of the present disclosure may, in part, use one or more models that are machine-learning algorithms. These models may be supervised or unsupervised. Supervised learning algorithms are trained using labeled data (i.e., training data) which consist of input and output pairs. By way of example and not limitation, supervised learning algorithms may include classification and/or regression algorithms such as neural networks, generative adversarial networks, linear regression, etc. Unsupervised learning algorithms are trained using unlabeled data, meaning that training data pairs are not needed. By way of example and not limitation, unsupervised learning algorithms may include clustering and/or association algorithms such as k-means clustering, principal component analysis, singular value decomposition, etc. Although the present disclosure may name specific models, those of skill in the art will appreciate that any model that may accomplish the goal may be used.

Figure 24:
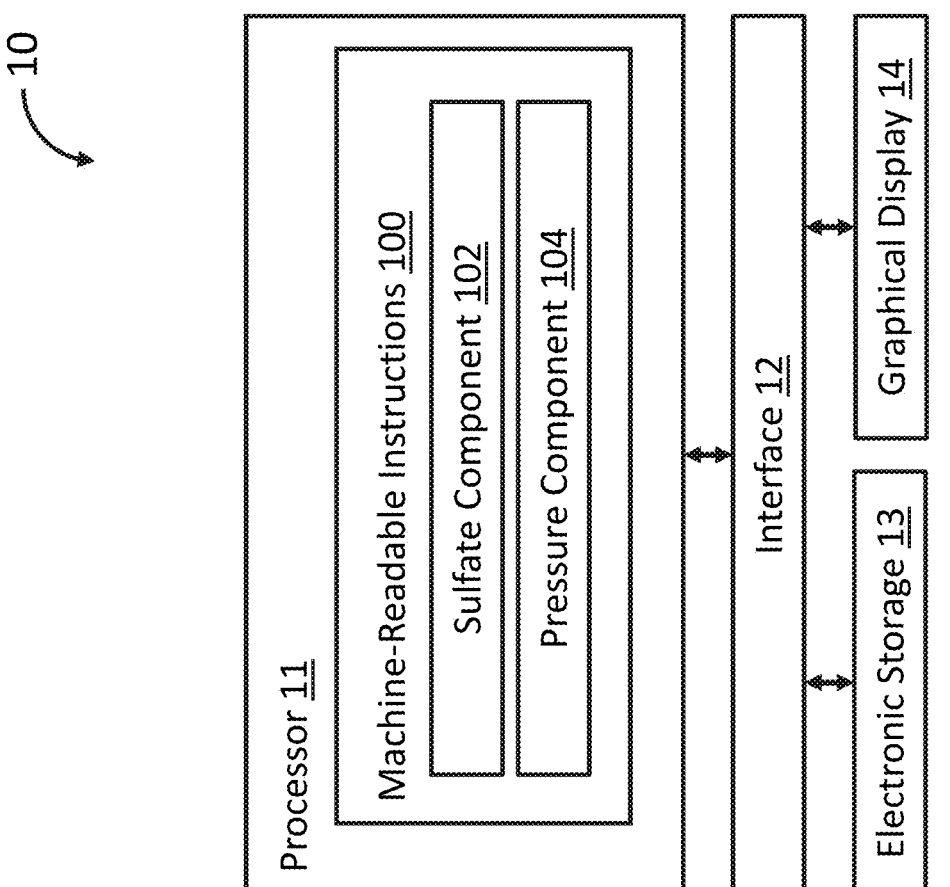
FIG. 24 illustrates an example system for modelling of a fluid treatment system.

The methods and systems of the present disclosure may be implemented by a system and/or in a system, such as a system 10 shown in FIG. 24. The system 10 may include one or more of a processor 11, an interface 12 (e.g., bus, wireless interface), an electronic storage 13, a graphical display 12, and/or other components. The models, the sulfate content value, the fouling factor value for the membrane, the TDS content value in the permeate stream, the detected anomaly, the recommendation, the pressure, or any combination thereof may be generated, predicted, trained/retrained, updated, etc. as described hereinabove by the processor 11 using inputs such as the synthetic data.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the synthetic data, the models, the sulfate content value, the fouling factor value for the membrane, the TDS content value in the permeate stream, the detected anomaly, the recommendation, the pressure, and/or other information. The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 24 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

The graphical display 14 may refer to an electronic device that provides visual presentation of information. The graphical display 14 may include a color display and/or a non-color display. The graphical display 14 may be configured to visually present information. The graphical display 14 may present information using/within one or more graphical user interfaces. For example, the graphical display 14 may present information relating to the models, the sulfate content value, the fouling factor value for the membrane, the TDS content value in the permeate stream, the detected anomaly, the recommendation, the pressure, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate modelling of a fluid treatment system. The machine-readable instructions 100 may include one or more computer program components. The machine-readable instructions 100 may include a sulfate component 102, a pressure component 104, and/or other computer program components.

It should be appreciated that although computer program components are illustrated in FIG. 24 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

Referring again to machine-readable instructions 100, the sulfate component 102 may be configured to obtain synthetic data for a fluid treatment system from a data store and train a performance indicator model using the synthetic data to predict a performance indicator for the fluid treatment system, among other functionalities. The fluid treatment system comprises a membrane and the fluid treatment system is configured to receive a stream of fluid for treatment. The performance indicator comprises a permeate sulfate performance indicator and the performance indicator model predicts a sulfate content value in a permeate stream.

The pressure component 104 may be configured to obtain synthetic data for a fluid treatment system from a data store and train a machine learning pressure prediction model using the synthetic data to predict a pressure for the membrane of the fluid treatment system, among other functionalities. The fluid treatment system comprises a membrane and the fluid treatment system is configured to receive a stream of fluid for treatment. The trained pressure prediction model is combinable with an operator training simulator (OTS) model to update the OTS model to improve accuracy of simulation pressure data from the OTS model.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein. FIGS. 6 and 15 illustrate example embodiments consistent with the instant disclosure.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:

obtaining synthetic data for a fluid treatment system from a data store, wherein the fluid treatment system comprises a membrane and the fluid treatment system is configured to receive a stream of fluid for treatment, and wherein the synthetic data comprises engineering cases and data generated through data augmentation techniques;

training a machine learning pressure prediction model using the synthetic data to predict a pressure for the membrane of the fluid treatment system;

obtaining a target operator training simulator (OTS) model from a data store;

combining the trained pressure prediction model with the target OTS model to update the target OTS model to form an updated target OTS model for operator training, wherein combining includes providing the pressure prediction for the membrane to the target OTS model to form the updated target OTS model;

obtaining process data for the fluid treatment system after operation commences at the fluid treatment system from a data store;

combining the process data with the synthetic data to generate hybrid data;

training a performance indicator model for membrane monitoring using the hybrid data to predict a performance indicator for the fluid treatment system, wherein the performance indicator comprises a fouling factor performance indicator and the performance indicator model predicts a fouling factor value for the membrane, and wherein the fouling factor value is a projection of membrane fouling over time and defined in Equation 1:

$$\text{Fouling factor} = (1 - X/100)^{Membrane\ Age}$$

where X is flux decline per year; and performing a task selected from the group consisting of (i) utilizing the updated target OTS model for operator training, (ii) utilizing the updated target OTS model for running a simulation, and (iii) generating the predicted fouling factor value for the membrane utilizing the performance indicator model and generating a maintenance recommendation for the membrane via a graphical user interface based on the predicted fouling factor value for the membrane.

2. The method of claim 1, wherein the treatment of the stream of fluid has not commenced in the fluid treatment system when the synthetic data is obtained.

3. The method of claim 1, wherein training the machine learning pressure prediction model using the synthetic data to predict the pressure for the membrane of the fluid treatment system includes training to predict feed pressure of the membrane, reject pressure of the membrane, a plurality of reject pressures of the membrane, or any combination thereof.

4. The method of claim 1, further comprising combining the trained performance indicator model with the updated target OTS model to add the performance indicator to the updated target OTS model, wherein combining includes providing the performance indicator to the updated target OTS model.

5. The method of claim 1, further comprising:

training a second performance indicator model using target simulation pressure data to predict a second performance indicator for the fluid treatment system, wherein the second performance indicator comprises an anomaly detection performance indicator and the second performance indicator model detects an anomaly indicating that a parameter of the membrane is outside of a predetermined baseline.

6. The method of claim 5, further comprising detecting an anomaly that a parameter of the membrane is outside a predetermined baseline utilizing the performance indicator model.

7. The method of claim 6, further comprising generating a maintenance recommendation for the membrane based on the detected anomaly.

8. The method of claim 1, further comprising:

training a second performance indicator model using target simulation pressure data to predict a second performance indicator for the fluid treatment system, wherein the second performance indicator comprises a permeate sulfate performance indicator and the second performance indicator model predicts a sulfate content value in a permeate stream.

9. The method of claim 8, further comprising generating a predicted sulfate content value in the permeate stream utilizing the performance indicator model.

10. The method of claim 9, further comprising generating a maintenance recommendation for the membrane based on the predicted sulfate content value in the permeate stream.

11. A system comprising:

a processor; and a memory communicatively connected to the processor, the memory storing computer-executable instructions which, when executed, cause the processor to perform a method, the method comprising:

obtaining synthetic data for a fluid treatment system from a data store, wherein the fluid treatment system comprises a membrane and the fluid treatment system is configured to receive a stream of fluid for treatment, and wherein the synthetic data comprises engineering cases and data generated through data augmentation techniques;

training a machine learning pressure prediction model using the synthetic data to predict a pressure for the membrane of the fluid treatment system;

obtaining a target operator training simulator (OTS) model from a data store;

combining the trained pressure prediction model with the target OTS model to update the target OTS model to form an updated target OTS model for operator training, wherein combining includes providing the pressure prediction for the membrane to the target OTS model to form the updated target OTS model;

obtaining process data for the fluid treatment system after operation commences at the fluid treatment system from a data store;

combining the process data with the synthetic data to generate hybrid data;

training a performance indicator model for membrane monitoring using the hybrid data to predict a performance indicator for the fluid treatment system, wherein the performance indicator comprises a fouling factor performance indicator and the performance indicator model predicts a fouling factor value for the membrane, and wherein the fouling factor value is a projection of membrane fouling over time and defined in Equation 1:

$$\text{Fouling factor} = (1 - X/100)^{Membrane\ Age}$$

where X is flux decline per year; and performing a task selected from the group consisting of (i) utilizing the updated target OTS model for operator training, (ii) utilizing the updated target OTS model for running a simulation, and (iii) generating the predicted fouling factor value for the membrane utilizing the performance indicator model and generating a maintenance recommendation for the membrane via a graphical user interface based on the predicted fouling factor value for the membrane.

12. The system of claim 11, wherein the treatment of the stream of fluid has not commenced in the fluid treatment system when the synthetic data is obtained.

13. The system of claim 11, wherein training the machine learning pressure prediction model using the synthetic data to predict the pressure for the membrane of the fluid treatment system includes training to predict feed pressure of the membrane, reject pressure of the membrane, a plurality of reject pressures of the membrane, or any combination thereof.

14. The system of claim 11, wherein the computer-executable instructions which, when executed, cause the processor to perform the method, the method further comprising:

combining the trained performance indicator model with the updated target OTS model to add the performance indicator to the updated target OTS model, wherein combining includes providing the performance indicator to the updated target OTS model.

15. The system of claim 11, wherein the computer-executable instructions which, when executed, cause the processor to perform the method, the method further comprising:

training a second performance indicator model using target simulation pressure data to predict a second performance indicator for the fluid treatment system, wherein the second performance indicator comprises an anomaly detection performance indicator and the second performance indicator model detects an anomaly indicating that a parameter of the membrane is outside of a predetermined baseline.

16. The system of claim 15, wherein the computer-executable instructions which, when executed, cause the processor to perform the method, the method further comprising:

detecting an anomaly that a parameter of the membrane is outside a predetermined baseline utilizing the performance indicator model.

17. The system of claim 16, wherein the computer-executable instructions which, when executed, cause the processor to perform the method, the method further comprising:

generating a maintenance recommendation for the membrane based on the detected anomaly.

18. The system of claim 11, wherein the computer-executable instructions which, when executed, cause the processor to perform the method, the method further comprising:

training a second performance indicator model using target simulation pressure data to predict a second performance indicator for the fluid treatment system, wherein the second performance indicator comprises a permeate sulfate performance indicator and the second performance indicator model predicts a sulfate content value in a permeate stream.

19. The system of claim 18, wherein the computer-executable instructions which, when executed, cause the processor to perform the method, the method further comprising:

generating a predicted sulfate content value in the permeate stream utilizing the performance indicator model.

20. The system of claim 19, wherein the computer-executable instructions which, when executed, cause the processor to perform the method, the method further comprising:

generating a maintenance recommendation for the membrane based on the predicted sulfate content value in the permeate stream.

* * * * *